United States Patent [19]

Yanagida et al.

[11] Patent Number: 5,775,918
[45] Date of Patent: Jul. 7, 1998

[54] SYSTEM FOR MAKING EXAMINATION PAPERS AND HAVING AN AUTOMATIC MARKING FUNCTION

[75] Inventors: Masato Yanagida, Tokyo; Takako Sato, Yokohama; Tetsuya Kagawa, Ebina, all of Japan

[73] Assignee: Ricoh Company, Ltd., Tokyo, Japan

[21] Appl. No.: 728,386

[22] Filed: Oct. 9, 1996

Related U.S. Application Data

[62] Division of Ser. No. 367,429, Dec. 30, 1994, Pat. No. 5,597,311.

[30] Foreign Application Priority Data

Dec. 30, 1993 [JP] Japan .................................. 5-354382
Jul. 28, 1994 [JP] Japan .................................. 6-177199

[51] Int. Cl.$^6$ .............................. G09B 3/00; G09B 7/00
[52] U.S. Cl. .......................... 434/353; 434/362; 707/506
[58] Field of Search ................... 434/322–325, 434/337, 350, 353–362; 382/165, 176, 295, 204, 291, 317; 348/61; 455/2, 5.1; 705/10; 707/615, 500, 505, 506

[56] References Cited

U.S. PATENT DOCUMENTS

| | | | |
|---|---|---|---|
| 4,745,468 | 5/1988 | Von Kohorn | 434/323 X |
| 4,863,384 | 9/1989 | Slade | 434/308 X |
| 4,958,284 | 9/1990 | Bishop et al. | 434/353 |
| 5,084,819 | 1/1992 | Dewey et al. | 434/358 X |
| 5,452,379 | 9/1995 | Poor | 434/358 X |
| 5,508,731 | 4/1996 | Kohorn | 455/2 X |

*Primary Examiner*—Joe Cheng
*Attorney, Agent, or Firm*—Oblon, Spivak, McClelland, Maier & Neustadt, P.C.

[57] ABSTRACT

A system for making various kinds of examination papers and marking answers written in the papers is disclosed. The system has a data base at which data representing a number of questions are registered, and a paper making apparatus for producing an examination paper by using the question data of the data base. When a desired number of questions is entered on a number designating device, a question making device randomly selects, among the questions registered at the data base, the desired number of questions and writes them in a question storage to thereby make questions. A paper outputting device forms an image representing the questions on a sheet to thereby produce an examination paper. In addition, the system is capable of automatically marking such examination papers.

4 Claims, 37 Drawing Sheets

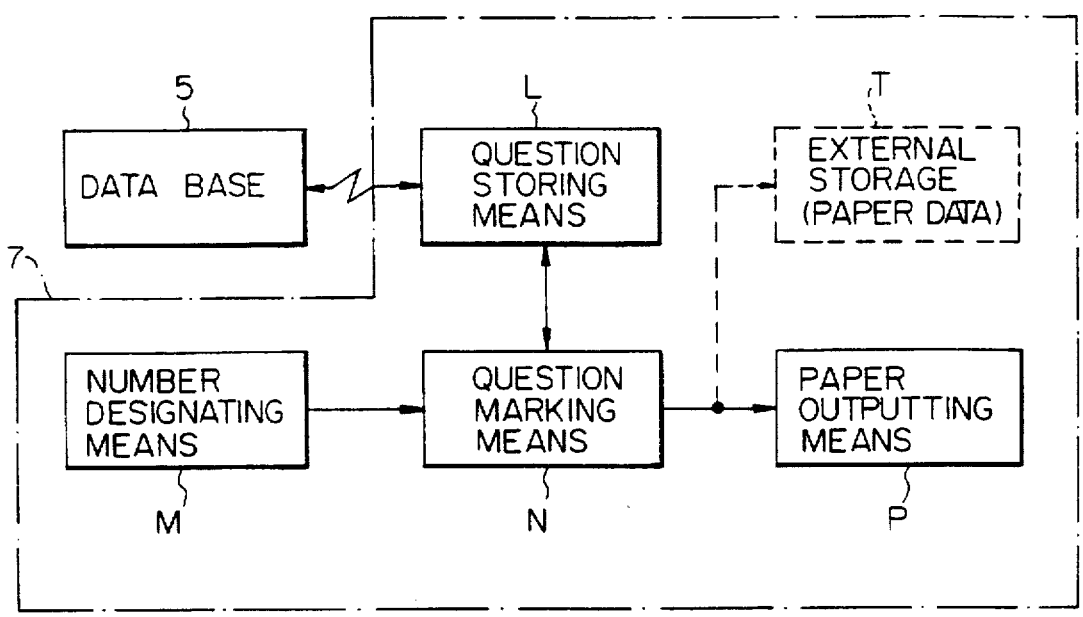
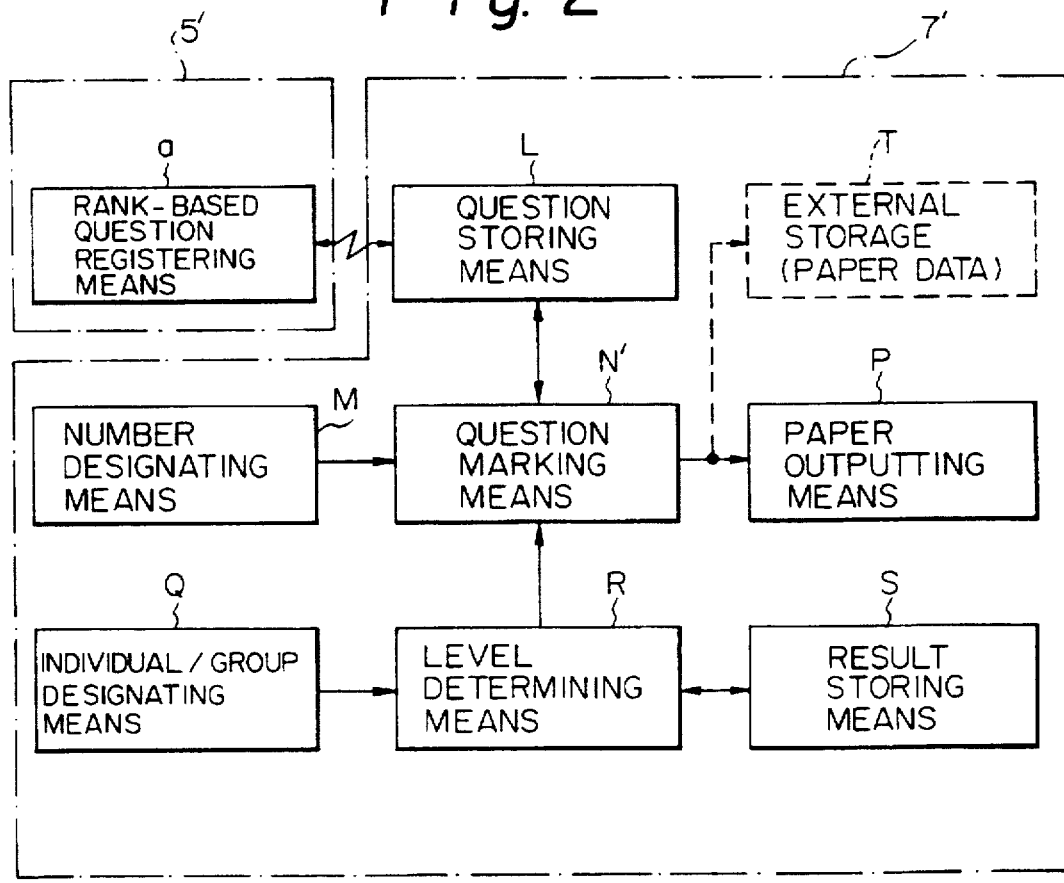

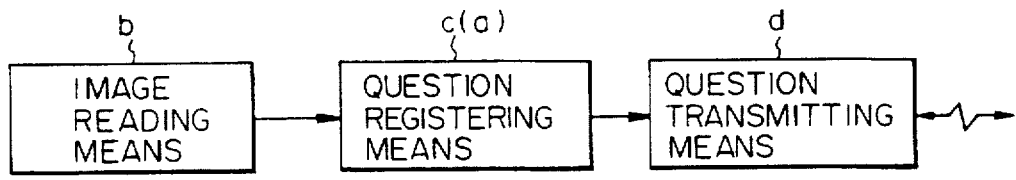
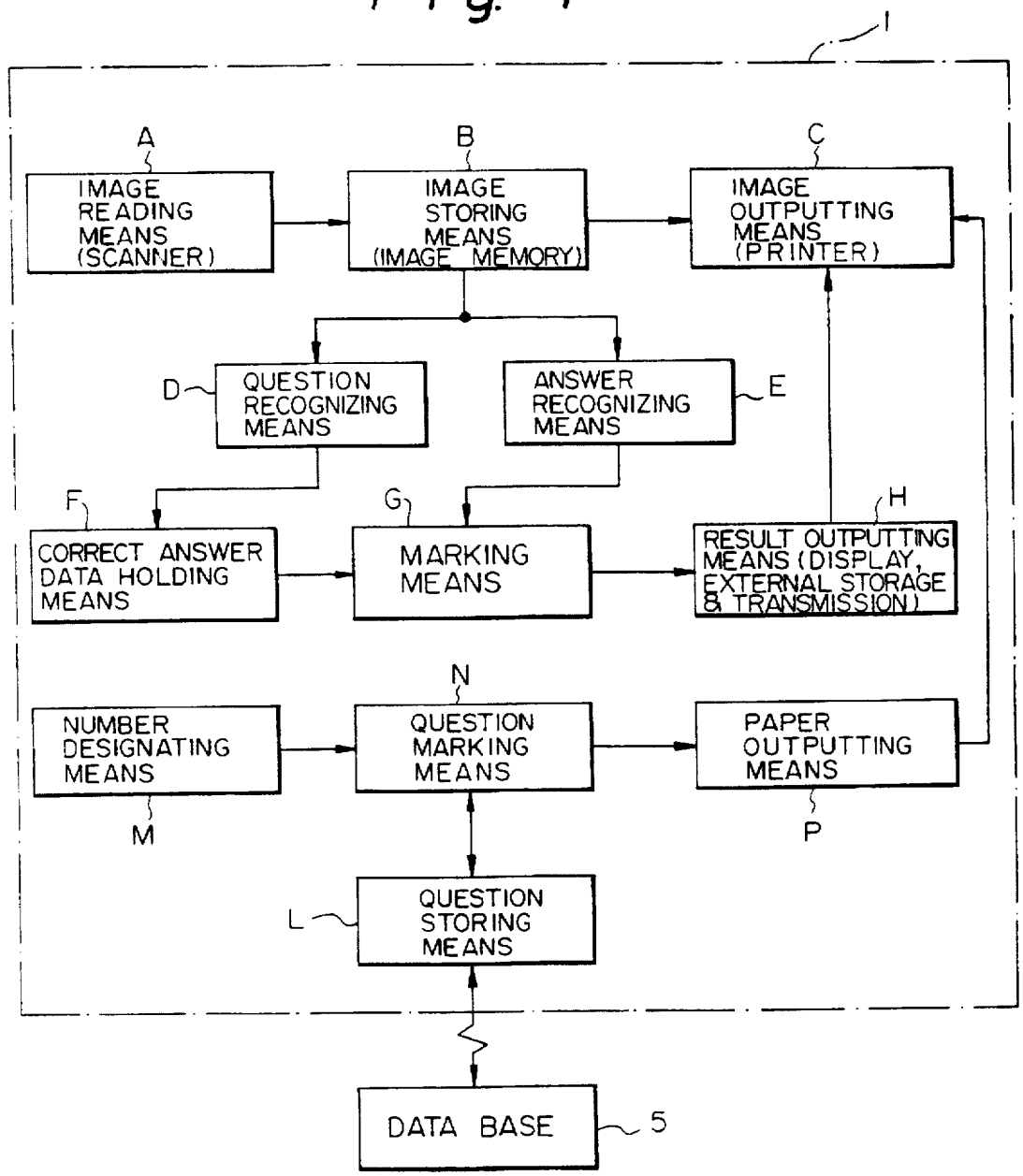

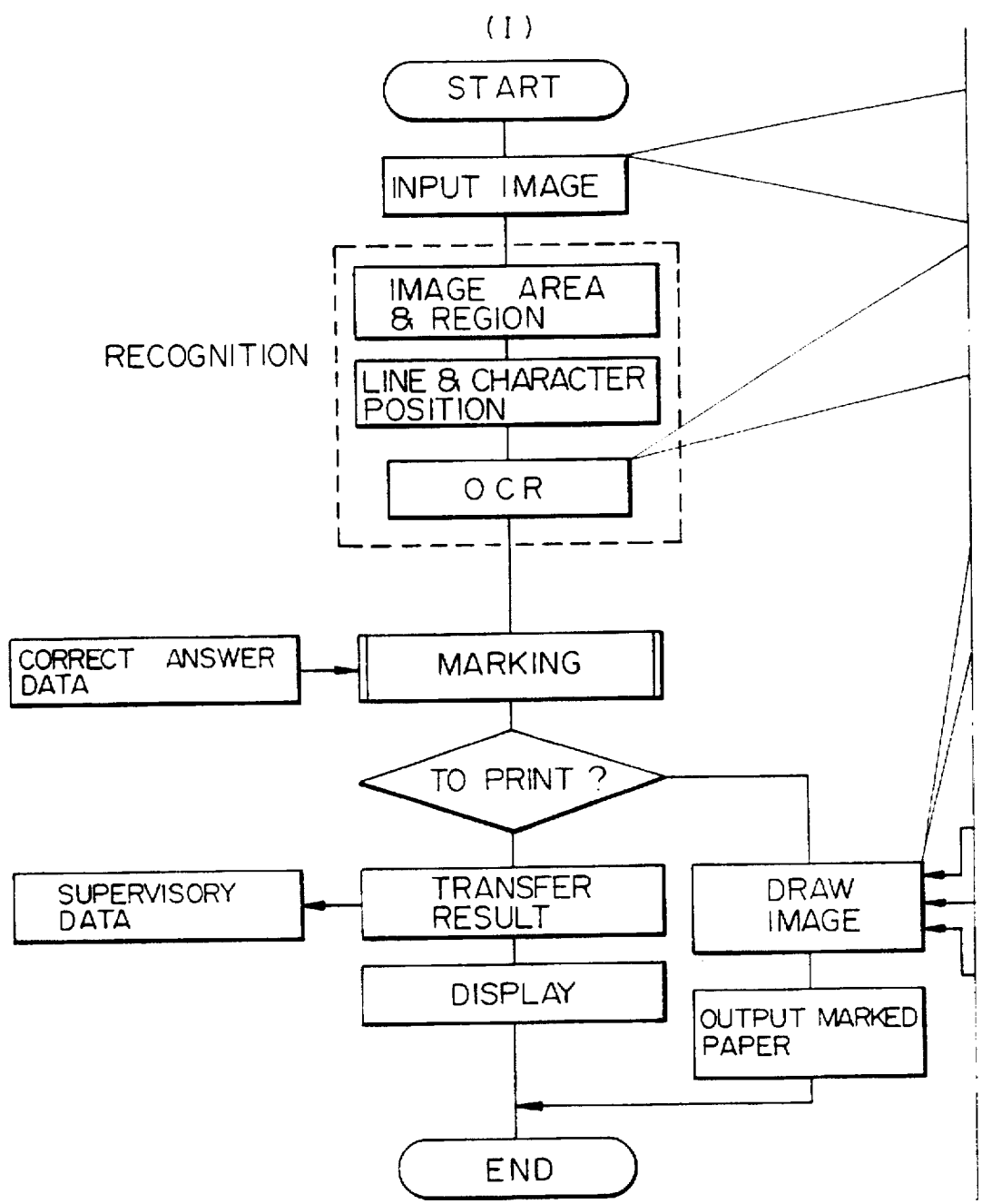

| SUBJECT / NAME | MATHEMATICS | JAPANESE | SCIENCE | | |
|---|---|---|---|---|---|
| Akiba | 70 | 80 | 100 | | |
| Inoue | 75 | 81 | 70 | | |
| Endo | 80 | 89 | 80 | | |
| Ota | 75 | 100 | 60 | | |
| Kawasaki | 70 | 60 | 40 | | |
| MEAN | 70 | 80 | 75 | | |

| TOTAL | DEVIATION |
|---|---|
| 420 | 59 |
| 360 | 45 |
| 380 | 47 |
| 440 | 63 |
| 402 | 57 |
| 405 | |

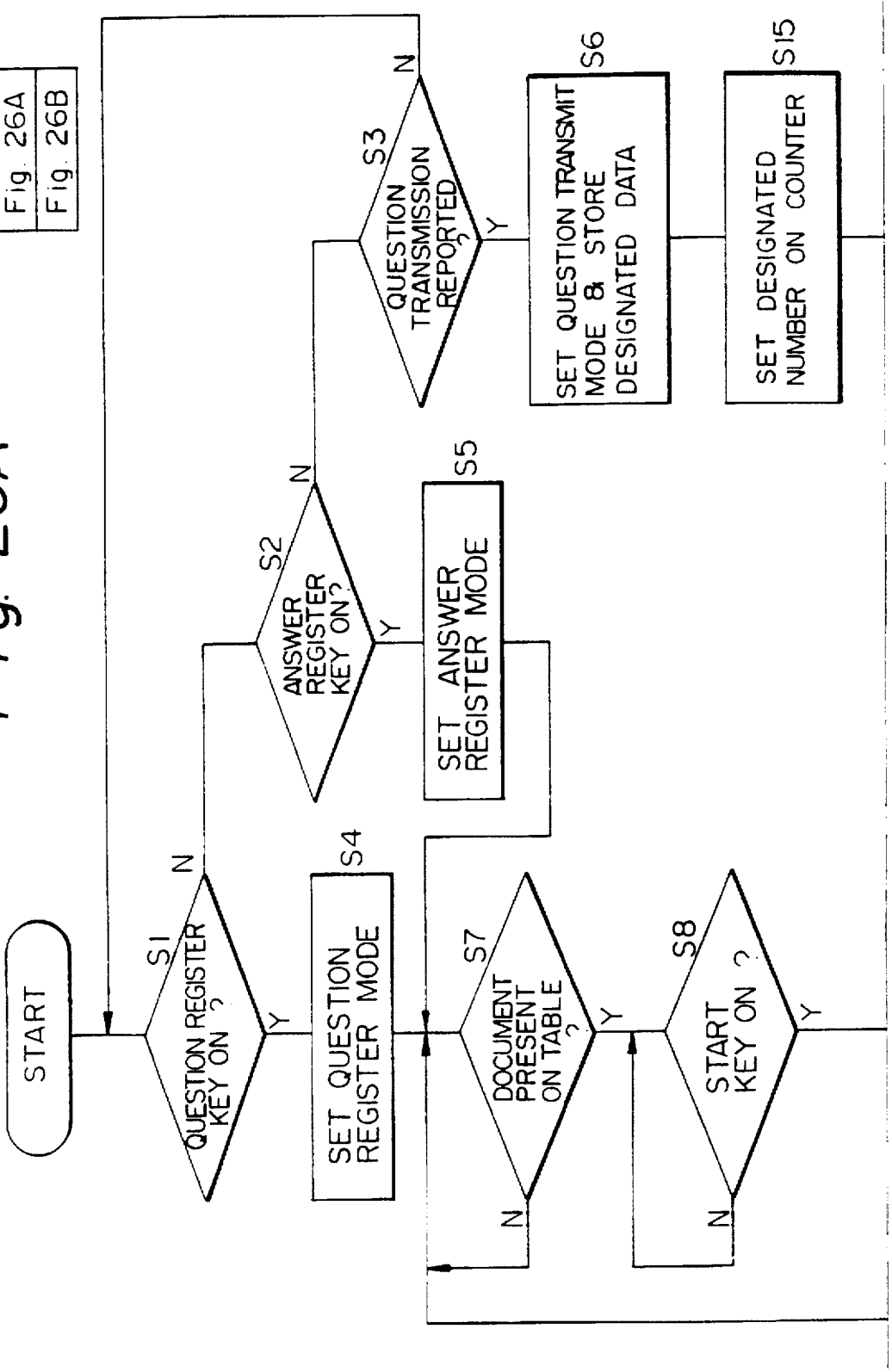

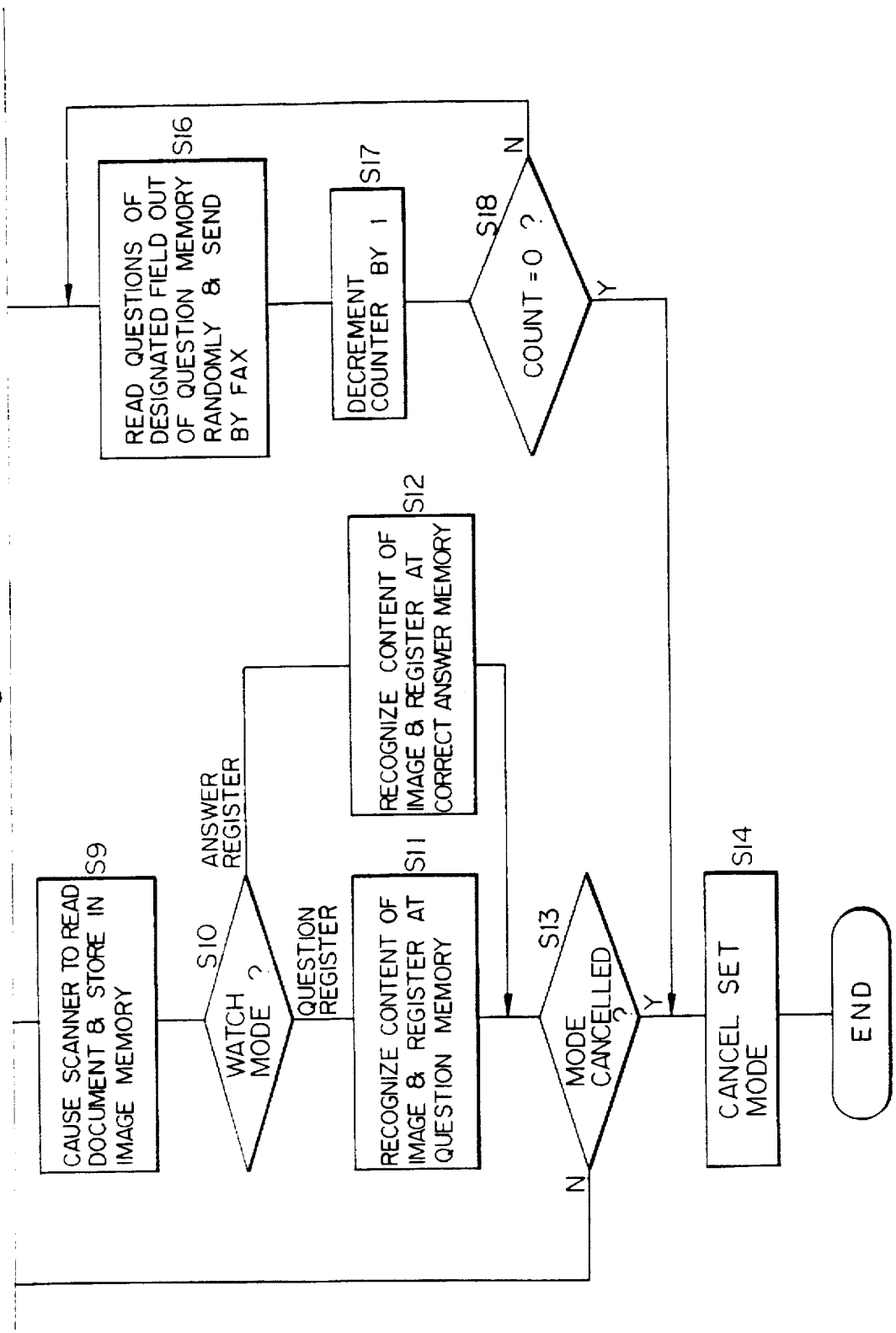

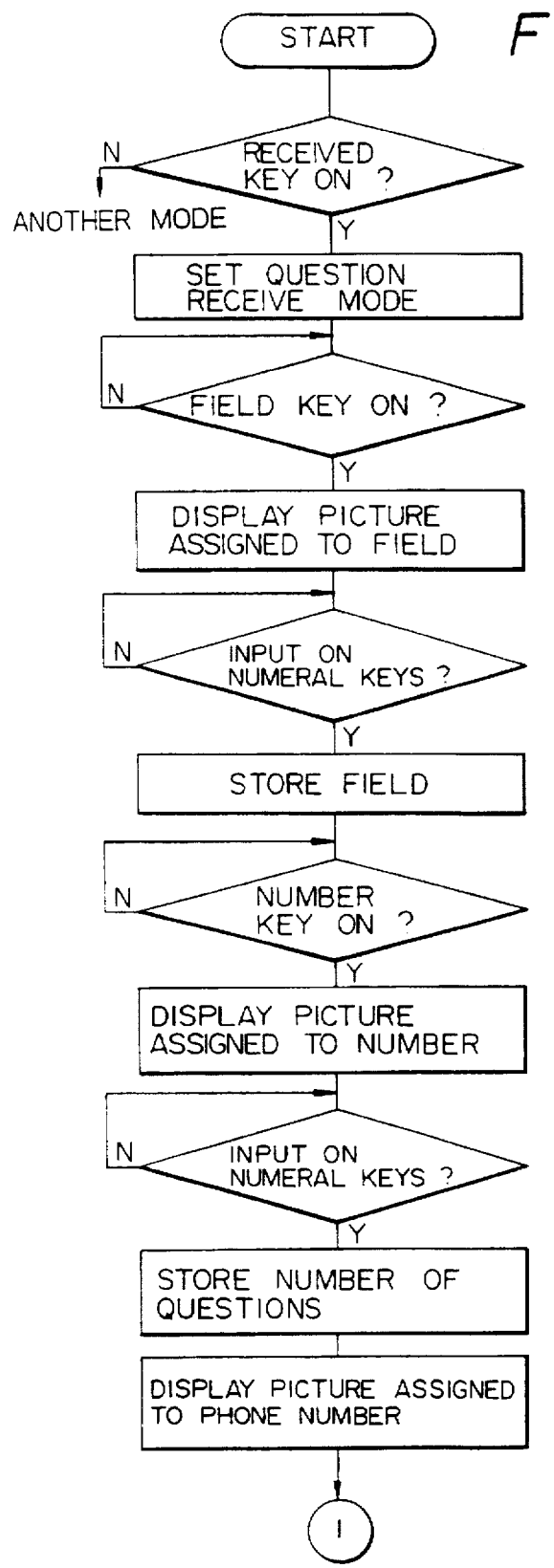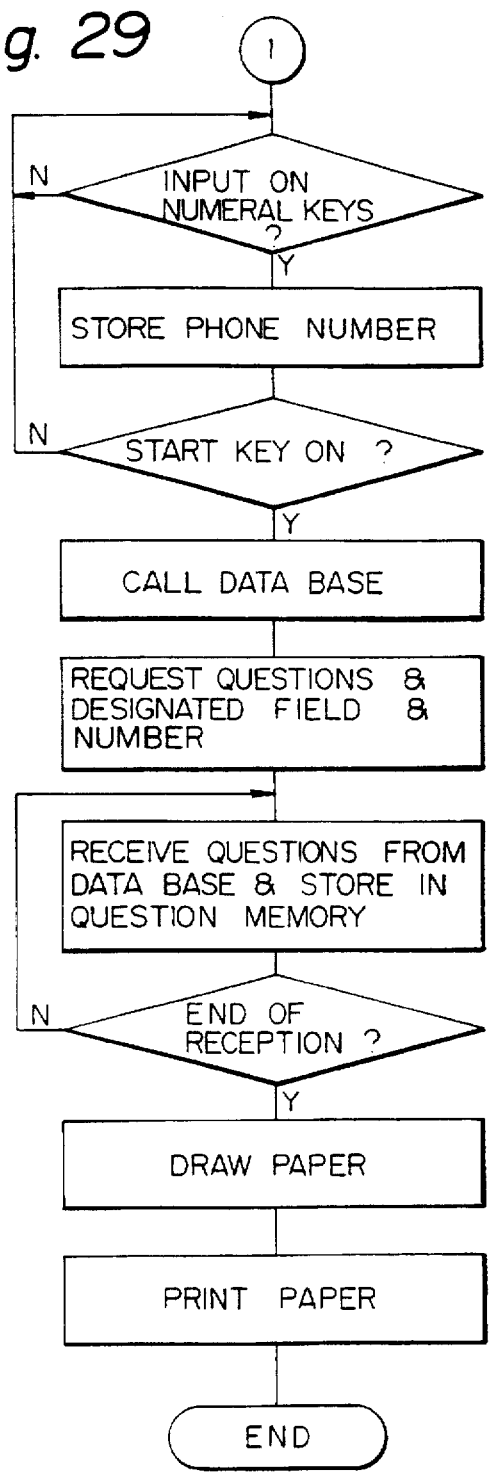
Fig. 29

Fig. 30

```
QUESTION RECEIVE MODE
FIELD OF QUESTIONS    SCIENCE : 10
                      SOCIAL
                      STUDIES : 11
                      MATHEMATICS : 12
```

Fig. 31

```
QUESTION RECEIVE MODE : SCIENCE

NUMBER OF
QUESTIONS  _____
```

Fig. 32

```
QUESTION RECEIVE MODE SCIENCE : 10

PHONE
NUMBER  _____
```

Fig. 37

| | EASY | DIFFICULT |
|---|---|---|
| SCIENCE | 001, 002, 003, 004, 005 | 101, 102, 103, 104, 105 |
| SOCIAL STUDIES | 001, 002, 003, 004, 005 | 101, 102, 103, 104, 105 |

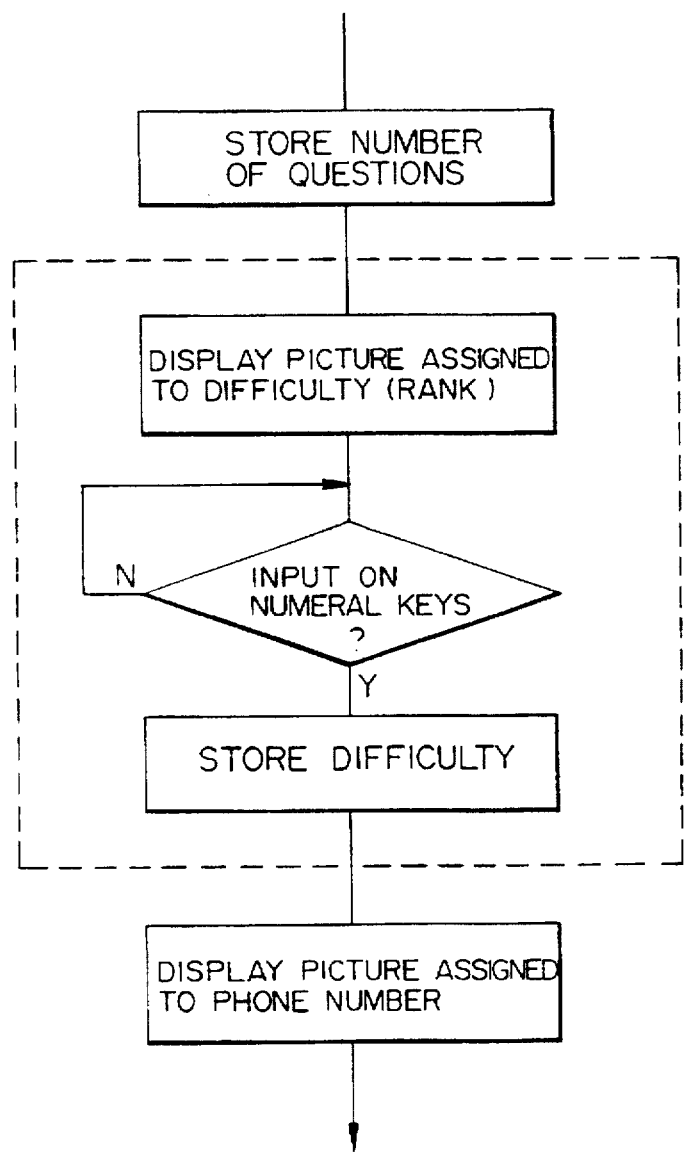

Fig. 43

| | | 001 | 002 | 003 | 004 | 005 | 006 | MENU | CLASS | |
|---|---|---|---|---|---|---|---|---|---|---|
| 1ST GRADE | YAMADA, Taro (101) | 60 | 70 | | | | | 65 | B | 60~79 |
| | YAMADA, Hanako (102) | 100 | 90 | | | | | 95 | A | 80~100 |
| 2ND GRADE | SUZUKI, Taro (201) | 20 | 30 | | | | | 25 | C | 0~59 |
| | SUZUKI, Hanako (202) | 80 | 90 | | | | | 85 | A | 80~100 |

Fig. 44

| RESULT SUPERVISORY TABLE | LEVEL OF QUESTIONS |
|---|---|
| A OR B | DIFFICULT |
| C | EASY |

SYSTEM FOR MAKING EXAMINATION PAPERS AND HAVING AN AUTOMATIC MARKING FUNCTION

This is a division of application Ser. No. 08/367,429, filed Dec. 30, 1994, now U.S. Pat. No. 5,597,311.

BACKGROUND OF THE INVENTION

The present invention relates to a system capable of producing various kinds of examination papers and automatically marking them after an examination.

In education facilities including schools and private schools, examinations are frequency given in order t o determine the result of learner's efforts, to rate the standing based on the result, to give a qualification, or to select new students. It has been customary for a teacher or similar examiner to prepare questions and an original document and produce a necessary number of examination papers by using a copier or simple printing machine, or hands it over to a trader concerned for printing. Also used in the education facilities are examination papers produced by a trader and printed with questions prepared by the trader. After examination, such papers are usually marked by an examiner, e.g., teacher. In the event of an examination for entrance or qualification or a large-scale trial examination, papers are marked by a number of persons or by an automatic marking system using a computer. It is also a common practice to total the results of marking of numerous examinees by use of a computer so as to calculate a mean percentage or deviations or tabulate or graph the results.

However, considerable labor is necessary for the examiner to prepare examination papers by himself, particularly when an examination is conducted often. For this reason, a majority of examinations given in primary schools, for example, are implemented by papers purchased from traders of concern. This brings about a problem that when an examination using such papers is conductive in one school, information on the examination is leaked out at, for example, a private school before the same papers are used in another school. Moreover, marking papers by hand is time and labor-consuming and, therefore, inefficient and, in addition, apt to result in errors. On the other hand, for automatic marking, papers in the form of marking sheets are predominant on which blank marks are printed beforehand to be painted by examinees. This kind of scheme is not desirable since questions must be answered in an extremely simple and limited way. Further, the automatic marking system is not practicable without an exclusive and high-speed apparatus capable of reading a number of papers and marking them in a short period of time. Such an apparatus needs a large capacity memory which increases the cost. In addition, since the automatic marking apparatus is large scale and requires special manipulation, it is not feasible for schools and private schools.

SUMMARY OF THE INVENTION

It is, therefore, a first object of the present invention to allow various kinds of papers to be readily produced by a copier which is one of necessaries even in a school today, particularly a digital copier or similar image processing apparatus.

It is a second object of the present invention to allow papers with answers entered therein to be marked automatically and easily by a digital copier or similar image processing apparatus.

In accordance with the present invention, a system for making an examination paper has a data base storing a number of questions registered thereat, and an apparatus for making an examination paper by using the questions registered at the data base. The apparatus has a question memory for storing data representing the questions received from the data base either directly or via a network, a number designating device for designating a desired number of questions, a question making device for randomly selecting, among the number of questions registered at the data base, the desired number of questions and writing them in the question memory to thereby make questions, and an outputting device for forming an image representing the questions made by the question making device on a recording sheet and outputting the sheet as an examination paper.

Also, in accordance with the present invention, a system for making an examination paper has a data base storing a number of questions registered thereat, and an apparatus for making an examination paper by using the questions registered at the data base. The data base has a question registering device for registering the number of questions while classifying the questions by rank. The apparatus has a question memory for storing the data of the questions received from the data base either directly or via a network, a result memory for storing the results of past markings on an individual basis or a group basis, a number designating device for designating a desired number of questions, a designating device for designating an individual or a group, a level determining device for determining, based on data stored in the result memory and representing the results of past markings, the level of the individual or the group designated by the designating device, a question making device for selecting, among the number of questions registered at the data base and classified by rank, the desired number of questions designated by the number designating device and belonging to the rank matching the level determined by the level determining device, and for storing the desired number of questions in the question memory to thereby make questions, and an outputting device for forming an image representing the questions made by the question making device on a sheet and outputting the sheet as an examination paper.

Also, in accordance with the present invention, a data base has an image reading device for reading the image of an examination paper, a question registering device for registering image data generated by the image reading device as data representing questions, and a question sending device for selectively sending the data of questions registered at the question registering device in response to a request received from the outside.

Further, in accordance with the present invention, an image processing apparatus has a n image reading device for reading the image of a document, an image memory for storing image data generated by the image reading device, an image outputting device for forming the image data stored in the image memory on a sheet, a question recognizing device for recognizing, when the image reading device reads an examination paper, questions out of the image data, a correct answer recognizing device for recognizing correct answers, an answer recognizing device for recognizing, out of the image data, characters, symbols or marks representing answers to the questions, a correct answer data holding device for holding data of correct answers to the questions beforehand or holding data of correct answers recognized by the correct answer recognizing device, a marking device for comparing the answers recognized by the answer recognizing device and the correct answers held by the correct answer data holding device question by question to thereby determine whether or not the answers are correct, and for calculating marks on the basis of the result of decision, a result outputting device for outputting the result of marking produced by the marking device on a sheet by forming an image representing the result, a question memory for receiving data of questions from a data base either directly or via a network, a number designating device for designating a desired number of questions, a question making device for randomly selecting, among a number of questions registered at the data base, the desired number of questions and storing the desired number of questions in the question memory to thereby make questions, and an examination paper ouputting device for causing the image outputting device to form an image representing the questions made by the question making device on a sheet, and for outputting the sheet as an examination paper.

Furthermore, in accordance with the present invention, an image processing apparatus has an image reading device for reading the image of a document an image memory for storing image data generated by the image reading device an image outputting device for forming the image data stored in the image memory on a sheet, a question recognizing device for recognizing, when the image reading device reads a n examination paper, questions out of the image data, a correct answer recognizing device for recognizing correct answers, an answer recognizing device for recognizing, out of the image data, characters, symbols or marks representing answers to the questions, a correct answer data holding device for holding the data of correct answers to the questions beforehand or holding the data of correct answers recognized by the correct answer recognizing device, a marking device for comparing the answers recognized by the answer recognizing device and the correct answers held by the correct answer data holding device question by question to thereby determine whether or not the answers are correct, and for calculating marks on the basis of the result of decision, a result outputting device for outputting the result of marking produced by the marking device on a sheet by forming an image representing the result, a result memory for storing the result of marking on an individual basis or a group basis, a question memory for receiving data of questions from a data base either directly or via a network, a number designating device for designating a desired number of questions, a designating device for designating an individual or a group, a level determining device for determining, based on cumulative data stored in the result memory, the level of the individual or the group designated by the designating device, a question making device for selecting, among the number of questions registered at the data base and classified by rank, the desired number of questions designated by the number designating device and belonging to the rank matching the level determined by the level determining device, and for storing the desired number of questions in the question memory to thereby make questions, and an outputting device for forming an image representing the questions made by the question making device on a sheet and outputting the sheet as an examination paper.

Moreover, in accordance with the present invention, an image processing apparatus has an image reading device for reading the image of a document, an image memory for storing image data generated by the image reading device, an image outputting device for forming an image representing the image data stored in the image memory on a sheet, a recognizing device for recognizing, when the image reading device reads an image of an examination paper, characters and rules out of resulting image data, an image-to-text converting device for converting the characters and rules recognized by the recognizing device to a predetermined text format, a registering device for registering the characters and rules having the predetermined text format as data of a new examination paper, and a paper outputting device for causing the image outputting device to form an image representing the data registered by the registering device on a sheet to thereby output an examination paper.

In addition, in accordance with the present invention, an image processing apparatus has an image reading device for reading the image of a document, an image memory for storing image data generated by the image reading device, an image outputting device for forming an image representing the image data stored in the image memory on a sheet, a question and correct answer recognizing device for recognizing, when the image reading device reads the image of an examination paper containing questions and correct answers described in an answer column, the characters of the questions and rules and the characters, symbols or marks of the correct answers out of the resulting image data, an image-to-text converting device for converting the characters of the questions and rules and the characters, symbols or marks recognized by the question and correct answer recognizing device to a predetermined text format, a question registering device for registering the data of the questions having the predetermined text format as data of a new examination paper, a correct answer registering device for registering the data of correct answers as correct answer data to the respective questions of the new examination paper, and a paper outputting device for causing the image outputting device to form an image representing the data registered by the question registering device on a sheet to thereby output an examination paper.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing an examination paper making system embodying the present invention;

FIG. 2 is a block diagram schematically showing an alternative embodiment of the present invention;

FIG. 3 is a block diagram schematically showing a specific construction of a data base included in the embodiment of FIG. 1 or FIG. 2;

FIGS. 4 and 5 are block diagrams each schematically showing another alternative embodiment of the present invention and having an automatic marking function;

FIG. 19 shows a specific marked paper which is the combination of the image of the paper shown in FIG. 17 and the result of marking;

FIG. 22 shows a specific table also showing mark data;

FIG. 26 is a flowchart demonstrating a specific operation of the data base shown in FIG. 24;

FIG. 29 is a flowchart showing a procedure in which the apparatus of FIG. 8 produces a paper in a question receive mode;

FIG. 30 shows a specific picture to appear in the procedure of FIG. 29 for urging the operator to enter a desired field of questions;

FIG. 31 shows a specific picture for urging the operator to enter a desired number of questions;

FIG. 32 shows a specific picture for urging the operator to enter a telephone number;

FIG. 37 shows how a number of questions are registered at the data base while being classified by field and rank specifically;

FIG. 38 is a flowchart showing processing to be added to FIG. 29 when the apparatus is capable of designating a rank to which questions belong;

FIG. 39 shows a specific picture to appear in the procedure of FIG. 38 for urging the operator to enter a degree of difficulty;

FIG. 43 shows a specific result supervisory table for storing the results of marking in a result memory shown in FIG. 27;

FIG. 44 shows specific criteria for selecting a level of questions by referencing the result memory of FIG. 43;

DESCRIPTION OF THE PREFERRED EMBODIMENTS

Referring to FIG. 1 of the drawings, an examination paper making system embodying the present invention is shown. As shown, the system is generally made up of a database at which a number of questions are registered in the form of data, and an examination paper making apparatus 7 for producing papers by using the question data registered at the data base 5. The apparatus 7 has means L for receiving the question data from the data base 5 either directly or via a network and storing them, means M for designating a desired number of questions, means N for selecting the designated number of questions randomly out of the questions registered at the data base 5, writing them in the storing means L, and thereby making questions, and means P for outputting a paper by forming an image representing the questions on a recording sheet.

FIG. 2 shows an alternative embodiment of the present invention. As shown, the system is also made up of a data base 5' and an examination paper making apparatus 7'. In this embodiment, the data base 5' includes means a for registering a number of questions while classifying them by rank. In the apparatus 7', means L receives question data registered at the data base 5' either directly or via a network and stores them. Means S stores the results of past marking on an individual basis or group basis. Means M designates the number of questions. Means Q designates an individual or a group. Means R determines the level of the individual or group designated by the means Q on the basis of the data stored in the result storing means S. Means N' selects the number of questions designated by the number designating means M out of the questions of the data base 5' belonging to the rank matching the level which is determined by the level determining means R, writes them in the storing means L, and thereby makes questions. Means P outputs a paper by forming an image representing the questions on a recording sheet.

In each of the systems shown in FIGS. 1 and 2, an extra storage T may advantageously be included in the apparatus 7 or 7' in order to store the questions made by the question making means N or N' as data representing the paper, as indicated by a phantom line in the figures.

As shown in FIG. 3, the data base should preferably be provided with means b for reading the image of a paper, means c for registering the image read by the reading means b as question data, and means d for selectively sending the question data registered at the registering means c in response to a transmit request from the outside (apparatus 7 or 7'). In the data base 5' shown in FIG. 2, the registering means c is implemented as the registering means a which registers the numerous images read by the reading means b while classifying them by rank.

Figure 5:
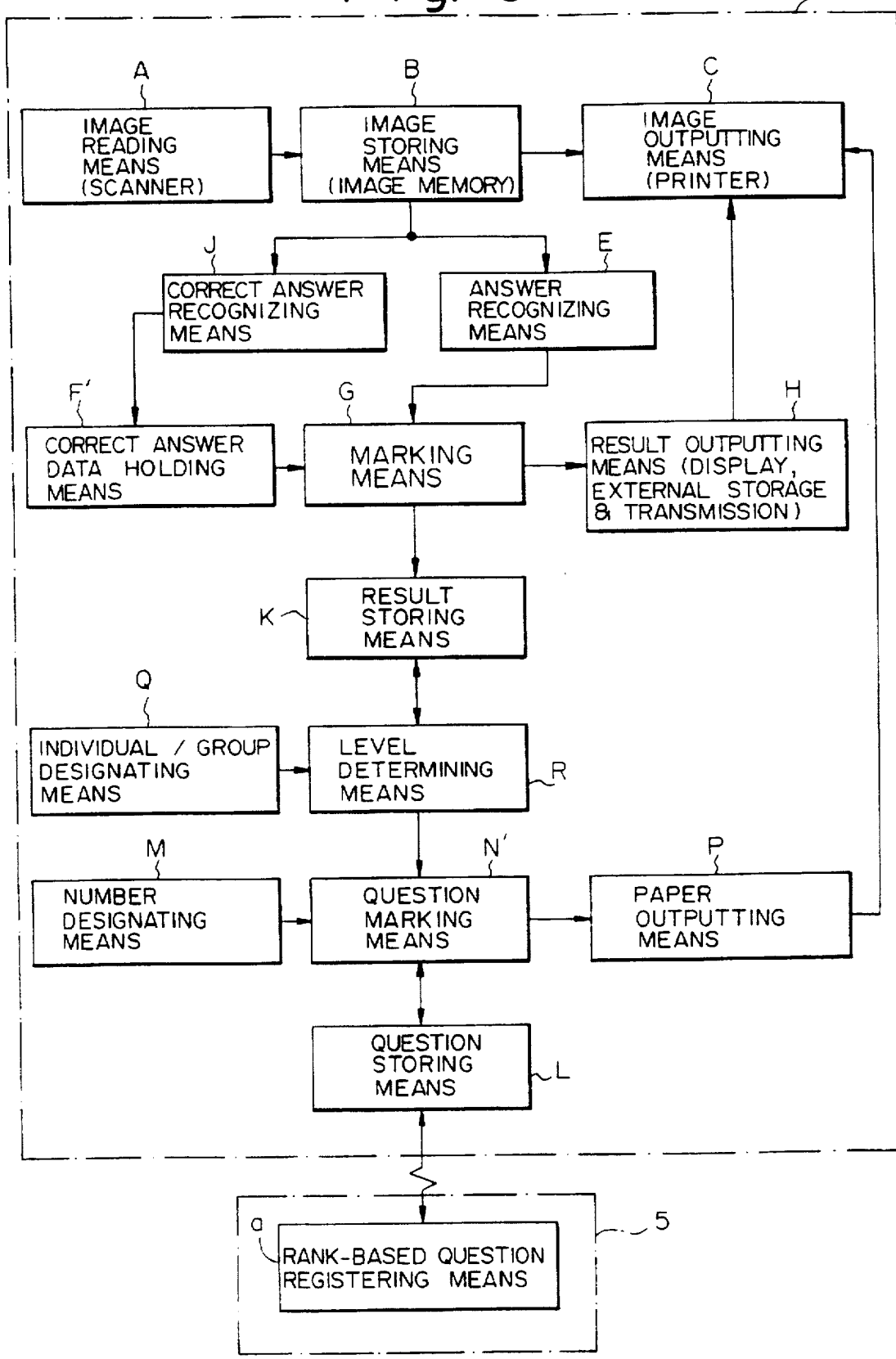

FIGS. 4 and 5 each shows another alternative embodiment of the present invention additionally having an automatic marking function, i.e., capable of achieving even the previously mentioned second object. As shown, the systems each has a data base 5 and an image processing apparatus 1 or 1'. The apparatus 1 or 1' has means A for reading a document image (image scanner), means B for storing image data generated by the reading means A (image memory), and means C for outputting the image data to form a corresponding image on a recording sheet (printer). Specifically, the apparatus 1 or 1' additionally includes means D for recognizing, when the reading means A has read a paper, the questions on the basis of the resulting image data, or means J for recognizing correct answers in the same way as the recognizing means D. Means E recognizes, based on the image data, characters, symbols or marks representing answers to the questions. Means F or F' stores beforehand data representing correct answers to the questions recognized by the recognizing means D or holds data representing the correct answers recognized by the correct answer recognizing means J. Means G compares, question by question, the answers recognized by the answer recognizing means E with the correct answers held by the correct answer holding means F or F' in order to determine whether or not the answers are correct, and then calculates a mark. Means H causes the image outputting means C to output the result of marking on a recording sheet.

The image processing apparatus 1 of FIG. 4 has question recognizing means D and correct answer data holding means F for storing beforehand data representing correct answers to questions recognized by the means D. The image processing apparatus 1' of FIG. 5 has correct answer recognizing means J and correct answer data holding means F' for holding data representing correct answers recognized by the means J. However, the means D and F and the means J and F' may be replaced with each other; the crux is that at least one of them be provided.

The apparatus of FIG. 4 additionally has question storing means L similar to the means 7 of FIG. 1, number designating means M for designating a desired number of questions; question making means N, and paper outputting means P for outputting a paper. The paper outputting means P causes image outputting means C to form on a recording sheet an image representing the questions made by the question making means, thereby producing a paper.

The apparatus of FIG. 5 additionally has result storing means K similar to the paper outputting means 7', of FIG. 2, question storing means L, number designating means M, individual/group designating means Q, level determining means R, question making means N', and paper outputting means P. The result storing means K stores the results of past marking produced by marking means G on an individual or group basis. The paper outputting means P causes image outputting means C to form on a sheet an image representing the questions made by the question making means N', thereby producing a paper.

Figure 6:
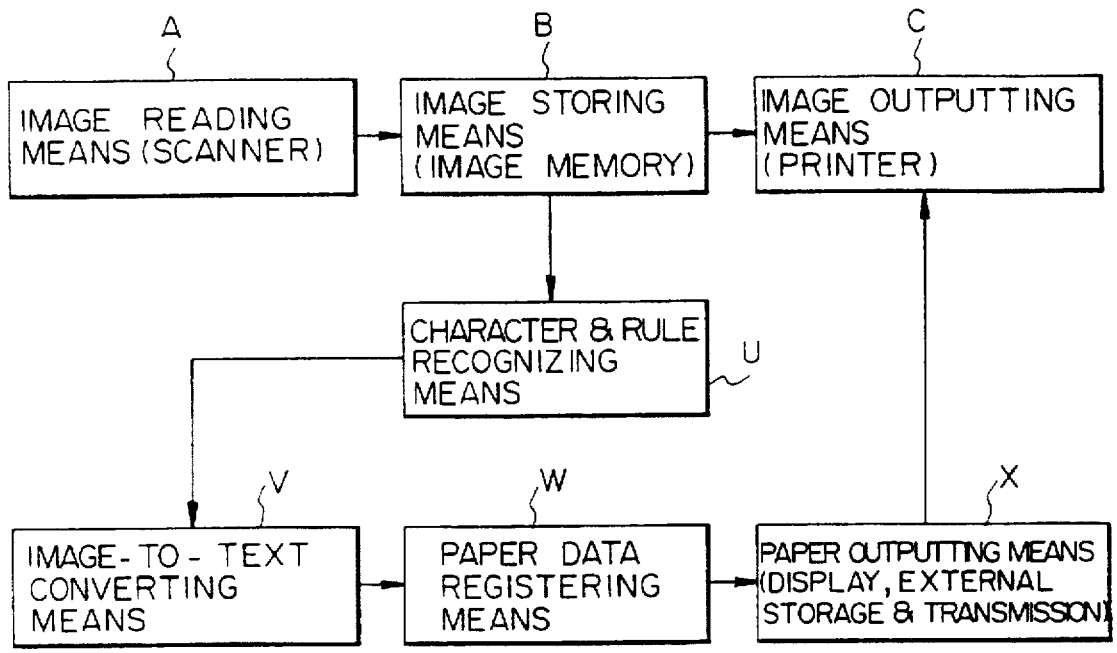
FIGS. 6 and 7 are block diagrams each schematically showing an image processing apparatus having a paper marking function in accordance with the present invention.

FIG. 6 shows an image processing apparatus capable of producing a papers without resorting to a data base. As shown, the apparatus has image s reading means A, image storing means B, and image outputting means C. When the image reading means A reads a paper set thereon, character and rule recognizing means U recognizes characters and rules out of the resulting image data. Image-to-text converting means V converts the recognized characters and rules to a text format. Paper data registering means W registers the data of text format as data representing a new paper. Paper outputting means X causes image outputting means C to form on a recording sheet an image representing the registered data, thereby producing a paper.

Figure 7:
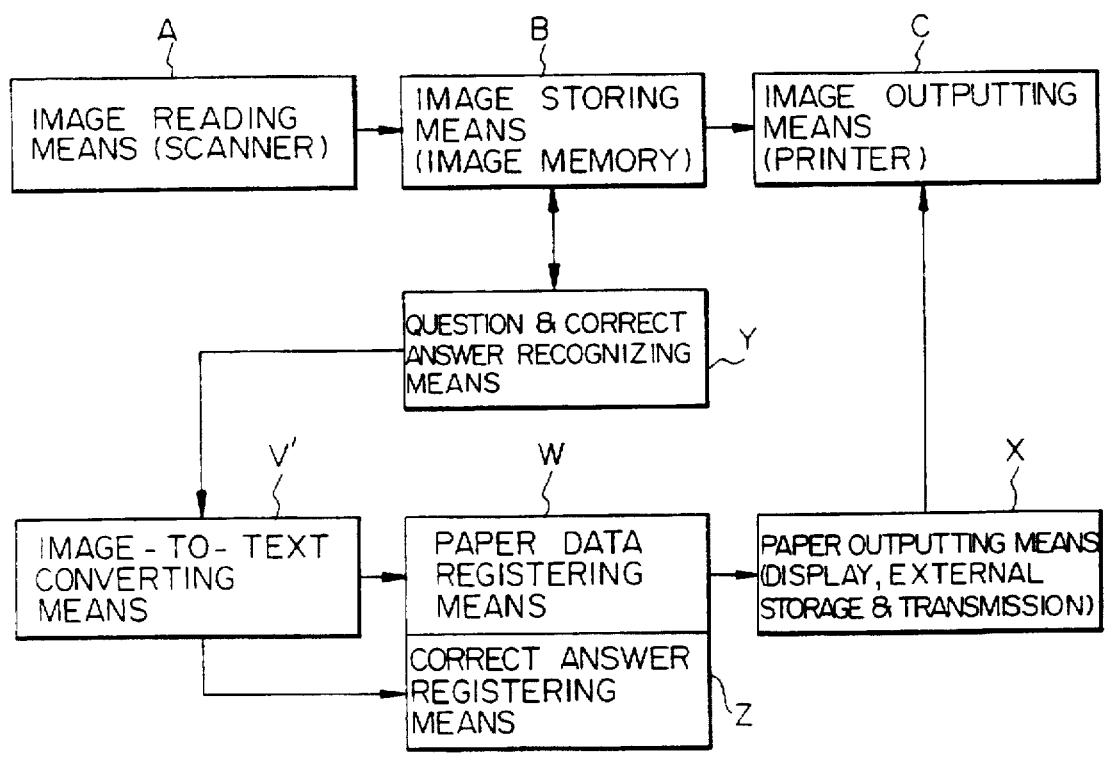

FIG. 7 shows a modification of the apparatus of FIG. 6. As shown, when image reading means A reads a paper set thereon and printed with questions and an answer column describing correct answers, question and correct answer recognizing means Y recognizes the characters of the questions and rules and the characters, symbols or marks of the correct answers out of the resulting image data, while distinguishing them from each other. Image-to-text converting means V' converts the recognized characters and rule of the questions and the characters, symbols or marks of the correct answers to a predetermined text format. Paper data registering means W registers data representing the questions of text format as data representing a new examination paper. Correct answer registering means Z registers data representing the correct answers as correct answer data respectively corresponding to the questions of the paper. Paper outputting means X causes image outputting means C to form on a recording sheet an image representing the registered data, thereby producing a paper.

Further, the apparatuses described above may be additionally provided with the automatic marking function implemented by the means A–H of the apparatus 1 of FIG. 4 or the apparatus 1' of FIG. 5. In the apparatus having the automatic marking function, the result outputting means H may be so constructed as to cause the image outputting means C to form on a paper, read by the image reading means A, an image representing the result of marking produced by the marking means G. In addition, the paper outputting means X may be provided with a function of displaying the data of registered paper, writing them in an external storage, or transmitting them in response to a request received from the outside.

The examination paper producing systems described above will be operated as follows.

In the system shown in FIG. 1, when a desired number of questions is entered on the number designating means M of the apparatus 7, the question making means N selects the designated number of questions randomly out of the numerous questions registered at the data base 5 and causes the question storing means L to store them. The question paper outputting means P prints the questions on a recording sheet to produce a paper. This allows papers for various kinds of examinations to be made up rapidly and easily only if a desired number of questions is entered on the apparatus 7.

In the system shown in FIG. 2, an individual or a group to take an examination is specified on the individual/group designating means Q of the apparatus 7. Also, a desired number of questions is entered on the number designating means M. Then, the level determining means S determines the level of the individual or group by referencing the result storing means S which stores data representing the results of past marking. The question making means N' selects, out of the numerous questions registered at the rank-based question registering means a of the data base 5', the desired number of questions entered on the number designating means M and causes the question storing means L to store them. The paper outputting means P prints the questions on a recording sheet to produce a question paper. Hence, the system can automatically select questions matching the results of past marking of the individual or group and produce adequate papers rapidly and easily.

With the data base shown in FIG. 3, it is possible to cause the image reading means b to read a paper newly made up by an examiner, register them at the question registering means c or a in addition to the questions registered beforehand, and send them in response to a request from the outside (paper making means).

In the system shown in FIG. 4, when an ordinary document is set on and read by the image reading means 4, the resulting image data are written to the image storing means B. The image data are printed out on a recording sheet by the image outputting means C. The system, therefore, allows a desired number of copies to be produced with ease, as with a conventional digital copier. The apparatus 1, like the apparatus 7 of FIG. 1, can select a desired number of questions randomly out of the questions registered at the data base 5 and output them on recording sheets. When an examination paper or an answer paper filled with answers by an examinee is set on and read by the image reading means A, the question recognizing means D recognizes questions out of the resulting image data. Then, correct answer data to the questions are read out of the correct answer holding means F. The answer recognizing means E recognizes the characters, symbols or marks of the answers. The marking means G compares the recognized answers with the correct answer data question by question, thereby calculating a mark. The result of marking is output on a recording sheet by the image outputting means C. In this manner, a paper can be automatically marked only if it is set on the image reading means.

The correct answer recognizing means J may recognize correct answer data (bar codes or similar codes) out of the image data read out of a paper and cause the correct answer data holding means F to hold them, as in the apparatus 1' of FIG. 5. Further, the apparatus 1' of FIG. S is capable of storing the results of past marking produced by the marking means G on an individual or group basis, and automatically selecting questions matching a level which is based on the results of past marking of an individual or group. This successfully produces adequate papers readily and easily.

In the apparatus of FIG. 6 or FIG. 7, as in the apparatus of FIG. 4 or FIG. 5, when an ordinary document to be copied is set on and read by the image reading means A, the resulting image data are once written to the image storing means B and then output on a recording sheet by the image outputting means. Hence, a desired number of copies can be readily produced, as with a conventional digital copier. It is possible, without a data base, to register data of a paper at the paper data registering means W while, if desired, registering data of correct answers to questions at the correct answer registering means Z. The data of the paper can be read out by the paper outputting means X and printed out on a recording sheet by the image outputting means C. Such apparatuses may be additionally provided with the automatic marking function implemented by the means A-H of FIG. 4 or FIG. 5. Then, they can reproduce ordinary documents, produce examination papers, and automatically mark the papers, as desired. In the apparatus having the automatic marking means, the result outputting means H may be so constructed as to cause the image outputting means C to form the result of marking produced by the marking means G on a paper itself which has been read by the image reading means A. This allows circles, crosses, triangles and similar patterns, showing whether or not answers are correct, to be printed on the individual paper together with a mark. The marked paper appears as if it were marked by hand.

The present invention will be described more specifically hereinafter.

Figure 8:
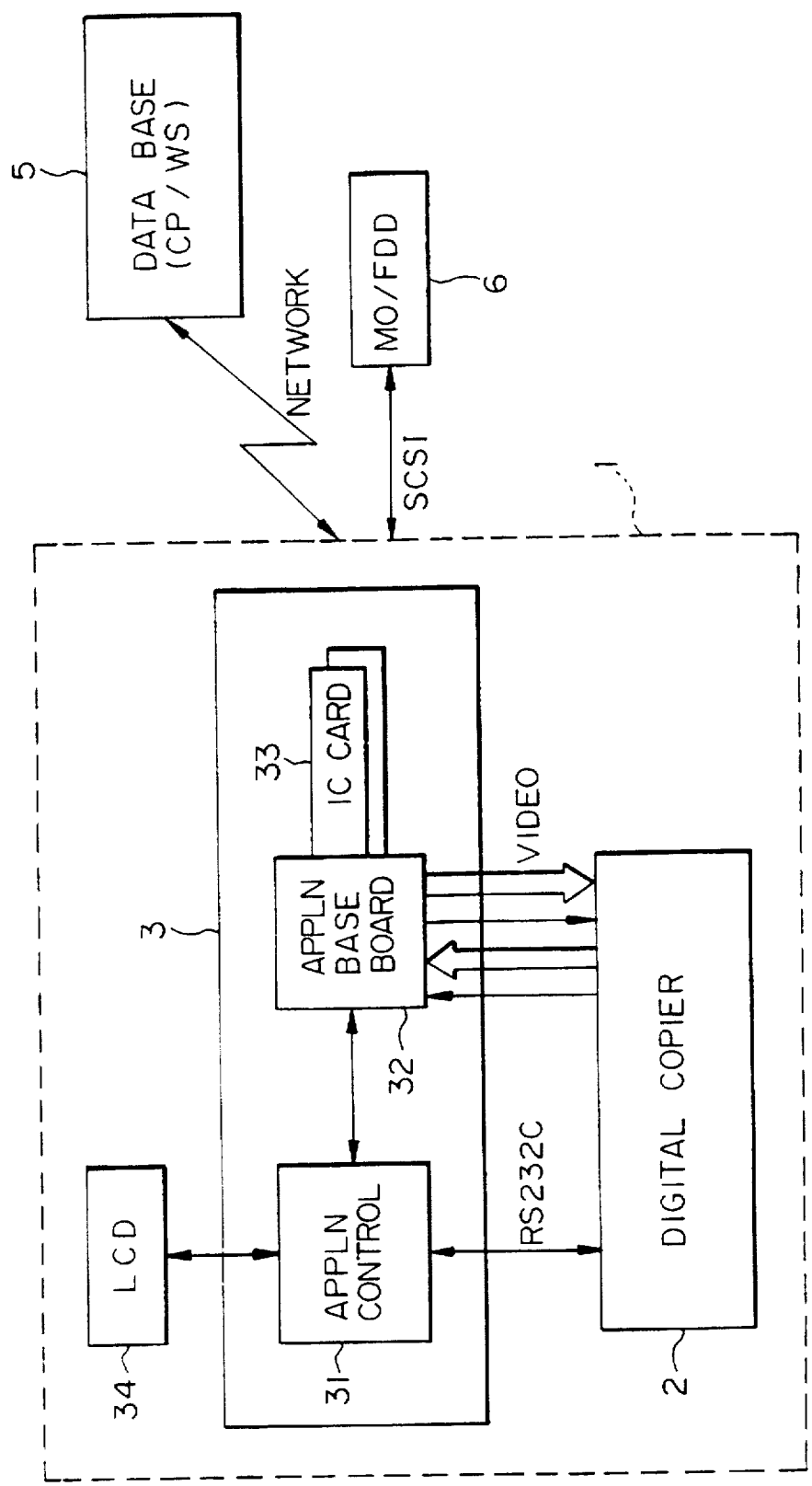
FIG. 8 is a block diagram schematically showing a specific hardware architecture of the system in accordance with the present invention.

FIG. 8 shows a specific hardware architecture of the examination paper making system in accordance with the present invention. As shown, an image processing apparatus 1 is included in the system and has a digital copier 2 and an application section 3 for implementing the marking procedure and paper making procedure. The application section 3 is connected to the copier 2 by various kinds of cables used to interchange commands and images. The apparatus 1 has the functions described with reference to, FIG. 1 or FIG. 2.

The application section 3 has an application controller 31 including a CPU (Central Processing Unit) which is supervised by an OS (Operating System), and an application board 32 connected to the controller 31 by a bus in order to, for example, execute various kinds of decisions, mark papers, make questions, and generate images. The application section 3 interchanges image data with the copier 2 by using RS232C communication commands. If desired, the application section 3 may be loaded with an application program, dictionary, font data, question data (including correct answers and allotting of marks) and other data implemented by an IC card 33. Such data may be received from the data base 5 via a network. Alternatively, the data base may be implemented as a magnetooptical (MO) disk drive, floppy disk drive (FDD), hard disk drive (HDD) or similar external storage 6 connected to the apparatus 1 by SCSI. While an LCD (Liquid Crystal Display) 34 is included in the application section 3, it can be implemented by a display provided on the operation and display panel of the copier 2. For the data base 5, use is made of a personal computer (PC) or a work station (WS) which stores numerous question data in a memory thereof, as will be described in detail later.

Figure 9:
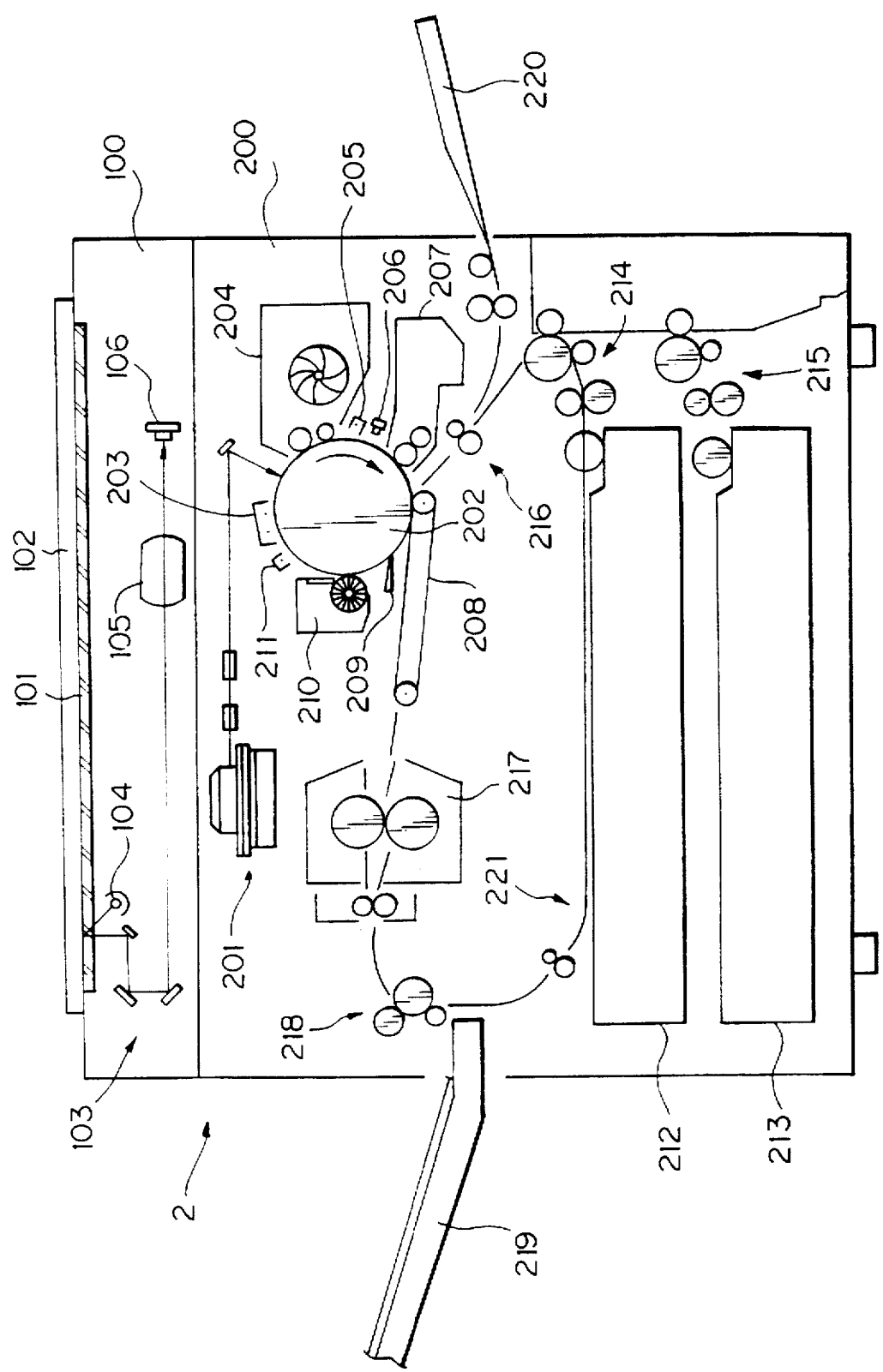
FIG. 9 is a section showing a specific construction of a mechanical arrangement forming part of a digital copier shown in FIG. 8.
Figure 10:
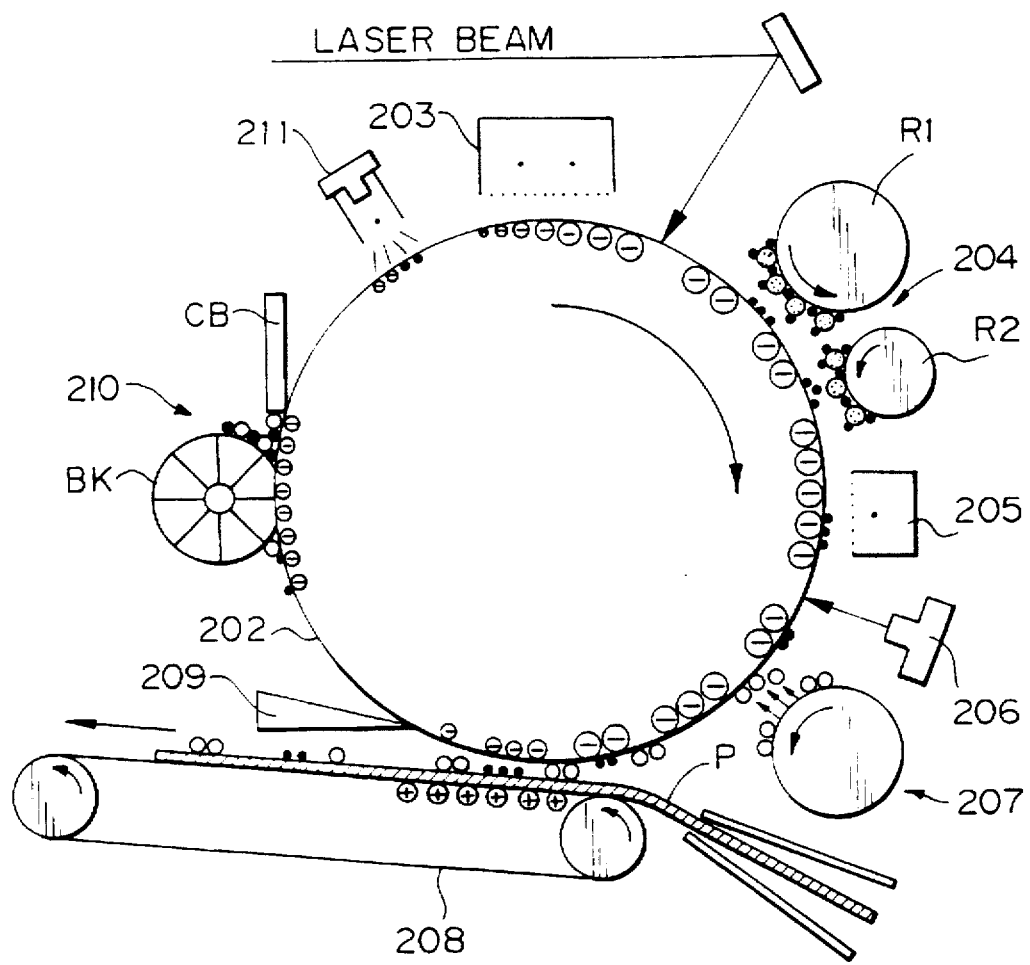
FIG. 10 is an enlarged view demonstrating image formation to occur around a photoconductive element included in a printer forming another part of the copier shown in FIG. 8.

FIG. 9 shows a specific construction of the digital copier 2. As shown, the copier 2 is generally made up of an image scanner (or simply scanner as referred to hereinafter) 100 located on the top of the copier 2, and a laser printer (or simply printer as referred to hereinafter) 200 disposed below the scanner 100. FIG. 10 shows an arrangement around a photoconductive drum 202 included in the printer 200.

A glass platen 101 is mounted on the top of the scanner 100 to be loaded with a document. A cover plate 102 is hinged to the scanner 100 and disposed above the glass platen 101. An optical scanning system, or optics, 103 is located below the glass platen 101 and includes a lamp 104. When the lamp 104 illuminates the underside of a document laid on the glass platen 101 face down, the resulting imagewise reflection is incident to a CCD (Charge Coupled Device) color image sensor 106 by way of mirrors and a lens 105 also included in the optics 103.

Since the optics 103 is driven in the right-and-left direction, as viewed in FIG. 9, by a drive mechanism, the color image sensor 106 reads the imagewise light from the document line by line. The color image sensor generates color image data in the form of three different signals respectively corresponding to R (red), G (green) and B (blue) components constituting the incident light. The image data read by the CCD 106 are once written to an image memory which will be described, subjected to image processing, converted to output image data, and then delivered to a writing device 201 included in the printer 200. In the writing device, a laser beam is modulated by the output image data and emitted via writing optics. As a result, as shown in FIG. 10, the laser beam exposes the surface of the photoconductive drum 202 which is rotating in a direction indicated by an arrow in the figure.

The surface of the drum 202 is uniformly charged to a predetermined high potential by a first charger 203 beforehand. Hence, as the laser beam is incident to the charged surface of the drum 202, the charge is selectively dissipated in accordance with the intensity of the incident light. As a result, a particular potential distribution matching the document image, i.e., an electrostatic latent image is formed on the drum 202. A black developing unit 4 has two developing rollers R1 and R2, FIG. 10. When the latent image passes by the black developing unit 204, the developing rollers R1 and R2 supply it with a black developer which constitutes a developer in combination with a carrier. Consequently, the black toner is deposited on the latent image to produce a corresponding toner image. A second charger 205 restores, by corona discharge, the surface potential of the drum 202 attenuated by the formation of the black image. LEDs (Light Emitting Diodes) 206 for second exposure are selectively turned on in association with a red image, thereby forming a red latent image on the drum 202. A developing unit 207 store a single component type red developer, i.e., nonmagnetic red toner. The red toner is deposited on the red latent image to form a corresponding red toner image without disturbing the black image existing on the drum 202.

Sheet cassettes 212 and 213 each stores recording sheets (plain papers) of particular size. A sheet is fed from the cassette 212 or 213 toward a registration roller pair 216 by a group of feed rollers 214 or 215. The registration roller pair 216 once stops the sheet and then drives it in synchronism with the image formation on the drum 202. When the sheet arrives at the drum 202, the composite black and red toner image charged to negative polarity is transferred to the sheet P, FIG. 10, by a transfer belt 208. At this instant, a predetermined positive bias voltage is applied to the transfer belt 208. After the image transfer, the sheet P is separated from the drum 202 by a separator 209 and conveyed to a fixing unit 217 by the belt 208. After the toner image has been fixed on the sheet by the fixing unit 217 using heat, the sheet is driven out to a tray 219 by a group of discharge rollers 218.

After the image transfer and sheet separation, the toner remaining on the drum 202 is removed by a cleaning brush BK and a cleaning blade CB included in a cleaning unit 210. Also, charges remaining on the drum 202 are dissipated by full-surface exposure effected by LEDs 211 and AC corona discharge effected by a discharger.

In FIG. 9, a manual tray is mounted on the copier 2 and used to feed sheets different in size or kind from the sheets stored in the cassettes 212 and 213 by hand. In a duplex copy mode or a composite copy mode, a sheet carrying an image on one side thereof and come out of the fixing unit 217 is redirected to a refeed path 221 by the discharge rollers 218 and again fed to between the drum 202 and the transfer belt 208.

Figure 11:
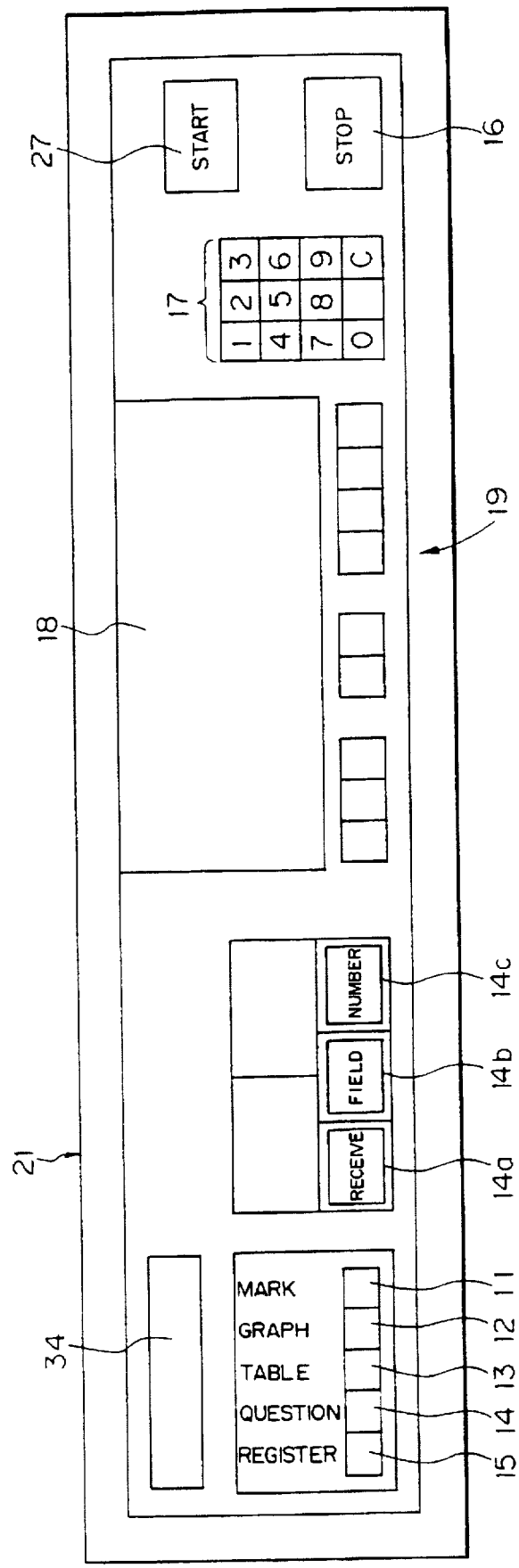
FIG. 11 is a plan view showing a specific arrangement of an operation and display panel provided on the copier of FIG. 8.

FIG. 11 shows a specific arrangement of an operation and display panel 21 provided on the copier 2. As shown, the panel 21 has at the left-hand side various keys in accordance with the present invention and used to select the functions available with the application section 3, FIG. 8. These keys are a mark key 11, a graph key 12, a table key 13, a question key 14, and a register key 15. With these keys, it is possible to select a mark mode for marking papers, a graph mode or a table mode for graphing or tabulating the results of a series of markings or the marking data stored, or a register mode for registering data representing a paper newly made up. A receive key 14a, a field key 14b and a number key, all of which relate to questions, are valid only when a question make mode is selected on the question key 14. The reference numeral 34 designates an LDC (also shown in FIG. 8) for displaying guidances and marks in the various modes.

Also arranged on the panel 21 are a start key 16, a stop key 27, numeral keys 17, a display and input portion 18 implemented by a liquid crystal touch panel, and keys 19 for selecting a paper size, image density, magnification, etc. The numeral keys 17 are accessible for entering various kinds of numerical values, e.g., a desired number of copies and and a desired number of questions. The keys 19 or the display and input portion 18 is also used to print a composite image (an image representing a paper in black and an image representing a marking in red), to send or receive data, and to write or read data in or out of the external storage.

Figure 12:
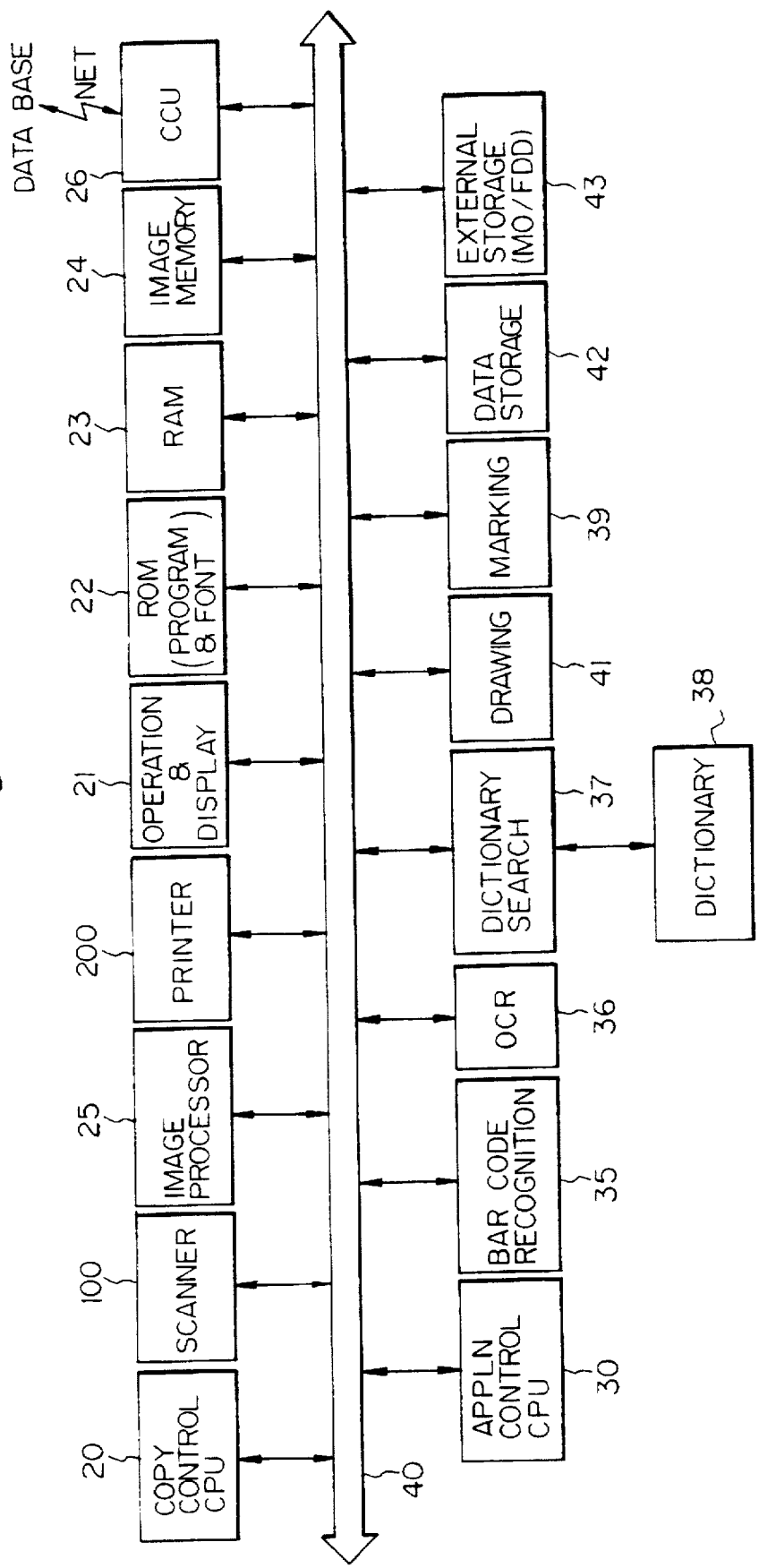
FIG. 12 is a block diagram schematically showing data processing and control particular to the copier and an application section shown in FIG. 8 and constructed integrally with each other.

The digital copier 2 and application section 3 of the apparatus shown in FIG. 8 may be arranged integrally with each other, as will be described with reference to FIG. 12. As shown, a CPU bus connects various blocks to a copy control CPU 20 and an application control CPU 30. The blocks located above the CPU bus 40 in the figure represent the blocks of the copier 2 to be mainly controlled or used by the copy control CPU 20. These blocks include, in addition to the scanner 100, printer 200 and operation and display panel 21, a ROM (Read Only Memory) 22, a RAM (Random Access Memory) 23, an image memory 24, an image processor 25, and a communication control unit (CCU) 26. The ROM 22 is a fixed memory storing application programs and font data to be used by the CPU 20 or 30. The RAM 23 serves as a buffer memory,work memory for the CPUs, and memory for temporarily storing the results of recognition, marking, etc. The image memory 24 is used to store the output of the image processor 25 which processes image data representing a document read by the scanner 100. The image memory 24 may be implemented by part of the RAM 23, if desired. The image processor 25 will be described in detail later The CCU 26 controls communication for interchanging data with the data base 5, e.g., host computer or personal computer via a network. A modem and network control unit are also included in the system, although not shown in the figure.

The blocks shown below the CPU bus 40 in the figure represent the blocks of the application section 3 to be mainly controlled or used by the application control CPU 30. These blocks include a bar code recognition 35, an OCR (Optical Character Recognition) 36, a dictionary search 37, a dictionary 38, a marking 29, an image drawing 41, a data store 42, and an external storage 43. The bar code recognition 35 recognizes, out of image data generated by the scanner 100, a bar code specifying questions printed on a paper, bar codes describing correct answer to respective questions, or similar bar codes. The OCR 36 recognizes, also out of image data generated by the scanner 100, characters of questions printed on a paper, rules forming an answer column, and handwritten characters, symbols or marks including an examinee's number. At the same time, the OCR 36 causes the dictionary search 37 to compare, for example, the recognized characters with the dictionary 38. While the marking 39 implements the marking function and paper making function, which are the major functions of the present invention, it will be described later in detail When paper data, marks, circle, cross and triangle patterns indicating the results of evaluation, characters and symbols representing correct answers, and comments are to be printed, the image drawing 41 transforms them to image data. The data store 42 stores question data and correct answer data received from the data base, comment data, marks, marking patterns (circle, cross, triangle, etc.) and supervisory data. The external storage 43 causes data to be written to a recording medium removable from the copier, e.g., a medium included in an MO disk device, FDD device or HDD device.

Figure 13:
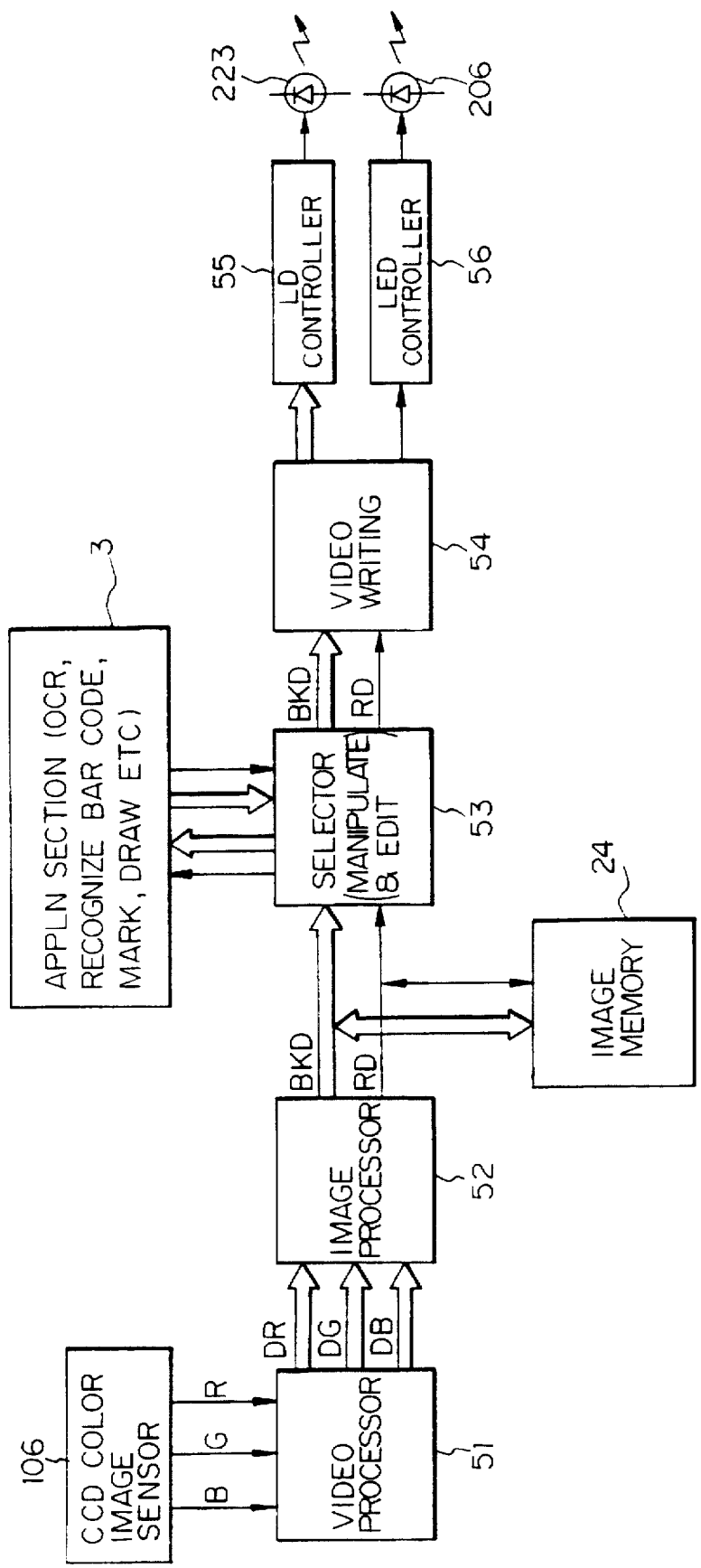
FIG. 13 is a block diagram schematically showing a data processing system included in a scanner forming still another part of the copier shown in FIG. 8.
Figure 14:
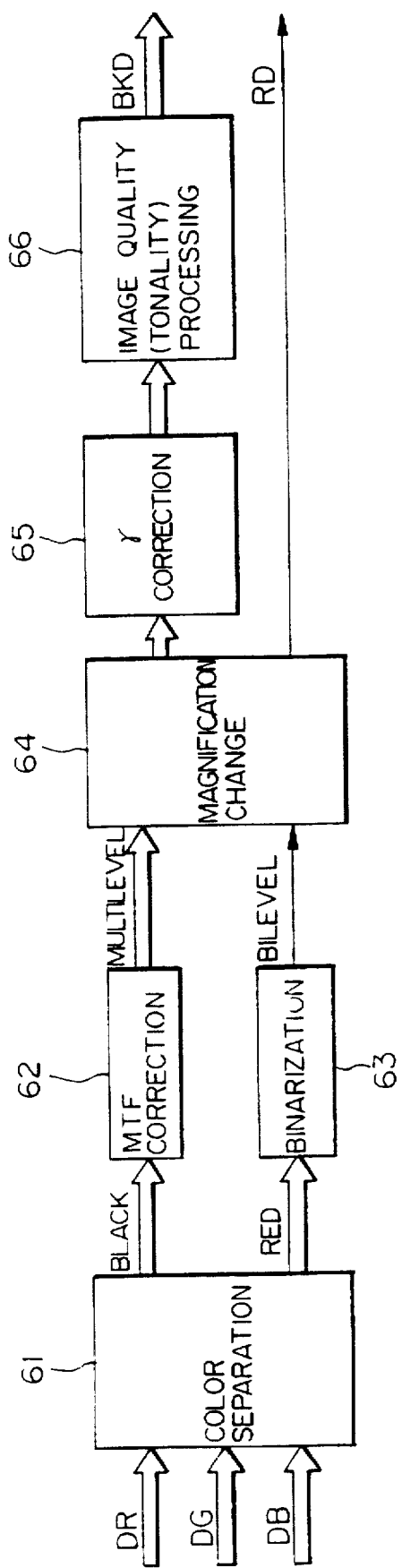
FIG. 14 is a block diagram schematically showing a specific construction of an image processing circuit included in the system of FIG. 13.

A reference will be made to FIGS. 13 and 14 for describing the system for processing the data generated by the scanner 100. FIG. 13 shows part of the control section of the copier which mainly joins in image processing. There are shown in the figure a video processor 51, an image processor 52, a selector 53, a video writing circuit 54, a laser diode (LD) controller 55, and an LED controller 56. The circuitry is controlled by the copy control CPU 20, shown in FIG. 12. The, color image sensor 106 and video processor 51 belong to the scanner 100. The video processor 51 transforms the analog R, G and B signals from the image sensor 106 to digital signals and then executes offset correction, shading correction, pixel position correction and other conventional processing with the digital signals, thereby producing multilevel red image data DR, green image data DG, and blue image data DB. The image processor 52 is included in the image processor 25, FIG. 12. As shown in FIG. 14, this circuit 52 is made up of a color separation circuit 61, an MTF (Modulation Transfer Function) correction circuit 61, a binarizing circuit 62, a magnification change circuit 64, a gamma ($\gamma$) correction circuit 65, and an image quality processing circuit 66. The image processor 52 executes processing with the image data DR, DG and DB from the video processor 51, as will be described in detail later.

Multilevel black image data BK and bilevel red image data from the image processor 52 are once written to the image memory 24. The image data read out of the image memory 24 are fed to a video writing circuit of the printer 200 in an ordinary copy mode or to the application section 3 in a mark mode. The selector 53 partly belongs to the image processor 25 and can manipulate (outline, shadow, italicize, etc.) or edit (move, combine, etc.) the individual image data to be delivered to the video writing circuit 54. In the event of printing the result of marking or a paper, image data generated by the image drawing 41 are fed from the application section 3 to the selector 53. Red image data RD, representing the result of marking, are combined with the black image data BKD fed from the image memory 24 and representing a The composite black and red image data are fed to the video writing circuit 54. When a paper should be output, only the black data BKD are sent to the video processing circuit 54.

The video writing circuit 54 transforms the individual image data from the selector 53 to video signals matching the writing speed of the printer 200. The circuit 54 controls the LD controller 55 on the basis of the black image data BKD so as to modulate a laser beam issuing from an LD 223 included in the writing device 201, FIG. 9. When red image data RD is present, the circuit 54 controls the LED controller 56 so as to selectively turn on or turn off the LEDs 206, FIGS. 9 and 10.

The processing to be executed by the video processor 51 and image processor 52 will be described in more detail The video processor 51 transforms the R, G, and B image signals from the color image sensor 106 to digital signals, while giving a, suitable gain thereto. Then, the processor 51 executes black offset correction shading correction and pixel position correction with the digital signals and outputs the resulting red image data DR, green image data IDG and blue image data DB in synchronism with a preselected clock. The data DR , DG and DB each has eight bits. The black offset correction refers to subtracting the black level of dark current of the image sensor 106 from the image data. The shading correction is effected to eliminate irregularities attributable to irregularities in the quantity of light to issue from the lamp 104, FIG. 9, in the main scanning direction and differences in sensitivity between the pixels of sensors constituting the image sensor 106 and assigned to the respective colors. For the shading correction, the scanner 100 reads a white plate of uniform density before scanning a document. Data representing the white plate are stored pixel by pixel and then used to divide image data representing a document pixel by pixel. The pixel position correction is executed in order to correct deviations between pixels in the vertical direction which occurs when the image sensor 106 is implemented as a three line image sensor.

As shown in FIG. 14, the image processor 52 receives the image data DR, DG and DB from the video processor 51. In the image processor 52, the color separating circuit 61 separates the input image data DR, DG and DB into M Rultilevel black image data and red image data. The MTF correction circuit 62 executes MTF correction with the eight bit black, image data. The binarizing circuit 63 binarizes the red image data to produce one bit red image data. The magnification change circuit 64 electrically changes the magnification of the data from the MTF correction circuit 62 and the data from the binarizing circuit 63. The gamma correction circuit 65 subjects the black image data from the magnification change circuit 64 to gamma correction. The image quality processing circuit 66 executes dither processing error scattering or similar processing (tonality processing) with the image data from the gamma correction circuit 65. The MTF correction circuit 62 corrects, for example, the deterioration of the optical frequency characteristic by using a bidimensional spatial filter.

To operate the image processing apparatus in an ordinary copy mode, a document is laid on the glass platen 101, FIG. 9, face down. After a desired number of copies has been entered on the numeral keys 17 (not entered in a single copy mode), the start key 16 is pressed. Then, the scanner 100 reads the document to generate corresponding image data. The image data are processed by the image processor 25, as stated above, and then written to the image memory 24. The printer 200 prints out the image data stored in the memory 24 a number of times corresponding to the desired number of copies.

While the image processing apparatus is capable o f producing copies in two colors the operation thereof is identical with the operation of a conventional bicolor digital copier and, therefore, will not not described specifically.

A reference will be made to FIGS. 15–22 for describing the operation of the application section 3 in each of a mark mode, graph mode, and paper make mode.

Figure 15B:
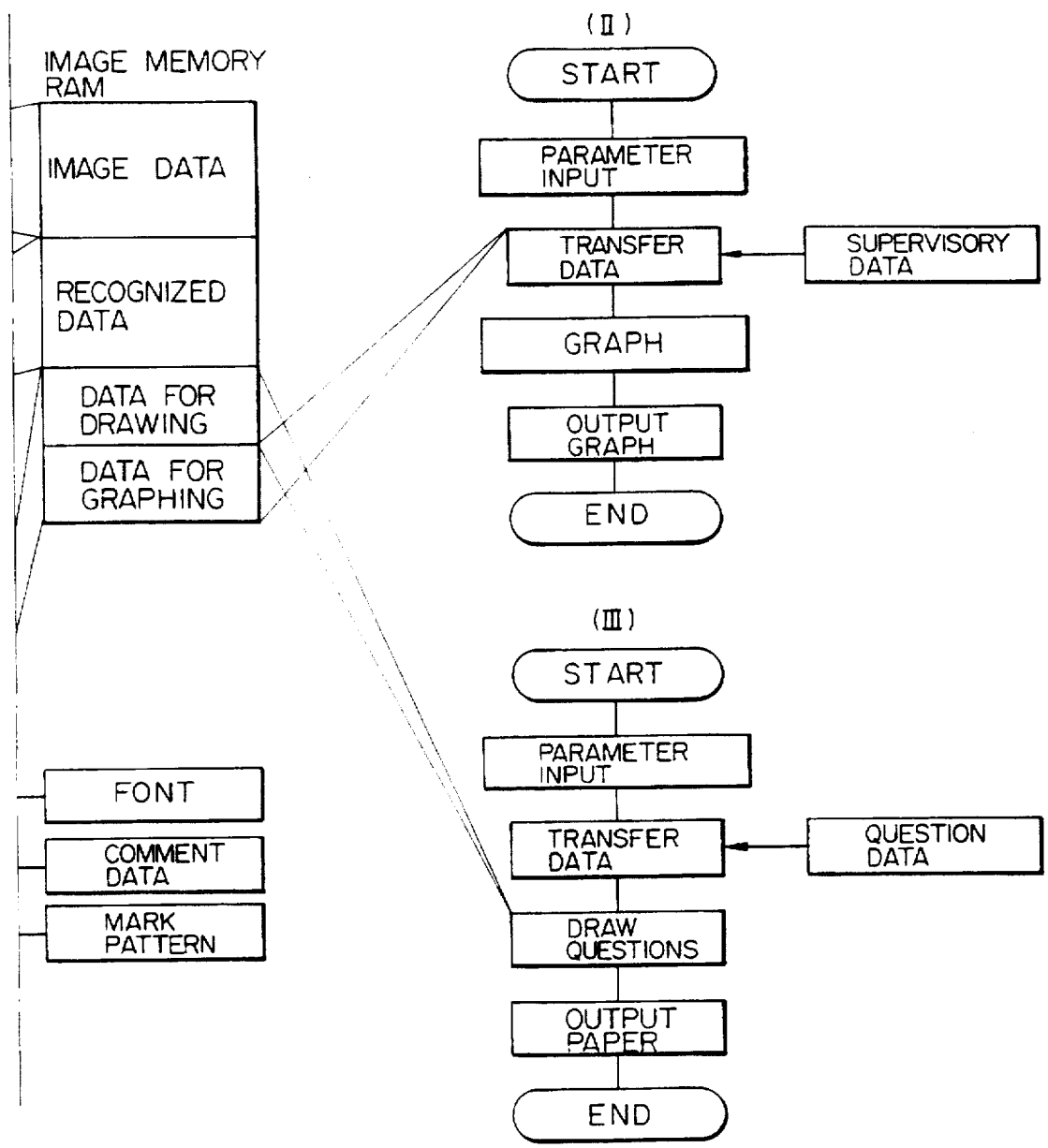
FIG. 15 is a flowchart showing various modes available with an application section of FIG. 13 in combination with data stored.

FIG. 15 shows procedures representing the modes available with the application section 3 in relation to stored data. In the figure, routines (I), (II) and (III) respectively occur in the mark mode, graph mode, and paper make mode. Among the various kinds of data, image data are written to the image memory 24. The recognition result data, drawn image data and data for generating a graph are written to the RAM 23. The fonts are stored in the ROM 22. The correct answer (and mark allotting) data, comment data, marking patterns (circles, crosses, etc.) and supervisory data are written to the data storage 42. Such data are each stored beforehand or stored after recognition or paper making.

When the mark key 11 on the operation and display panel 21, FIG. 11, is pressed, the mark mode is set up. A paper to be marked is laid on the glass platen 101 face down in the same manner as an ordinary document. When the start key 16 is pressed, the scanner 100 reads the paper. The resulting image data are processed by the image processor 25 and then written to the image memory 24. Subsequently, the routine (I) shown in FIG. 15 begins. First, the image data representing the paper are read out of the image memory 24 and then recognized by the OCR 36 (and bar code recognition 35). Specifically, the image area and regions of the input image data are recognized, and then the lines and the positions of characters (including symbols and marks) on the lines are recognized. Subsequently, the individual characters (type and handwriting) and rules are recognized by OCR. When an identification number is printed on the paper, it is also recognized. In the event of marking, among the correct answer (and mark allotting) data stored in the data storage 42 beforehand, the data matching the questions of the paper with the ID number can be designated.

Figure 17:
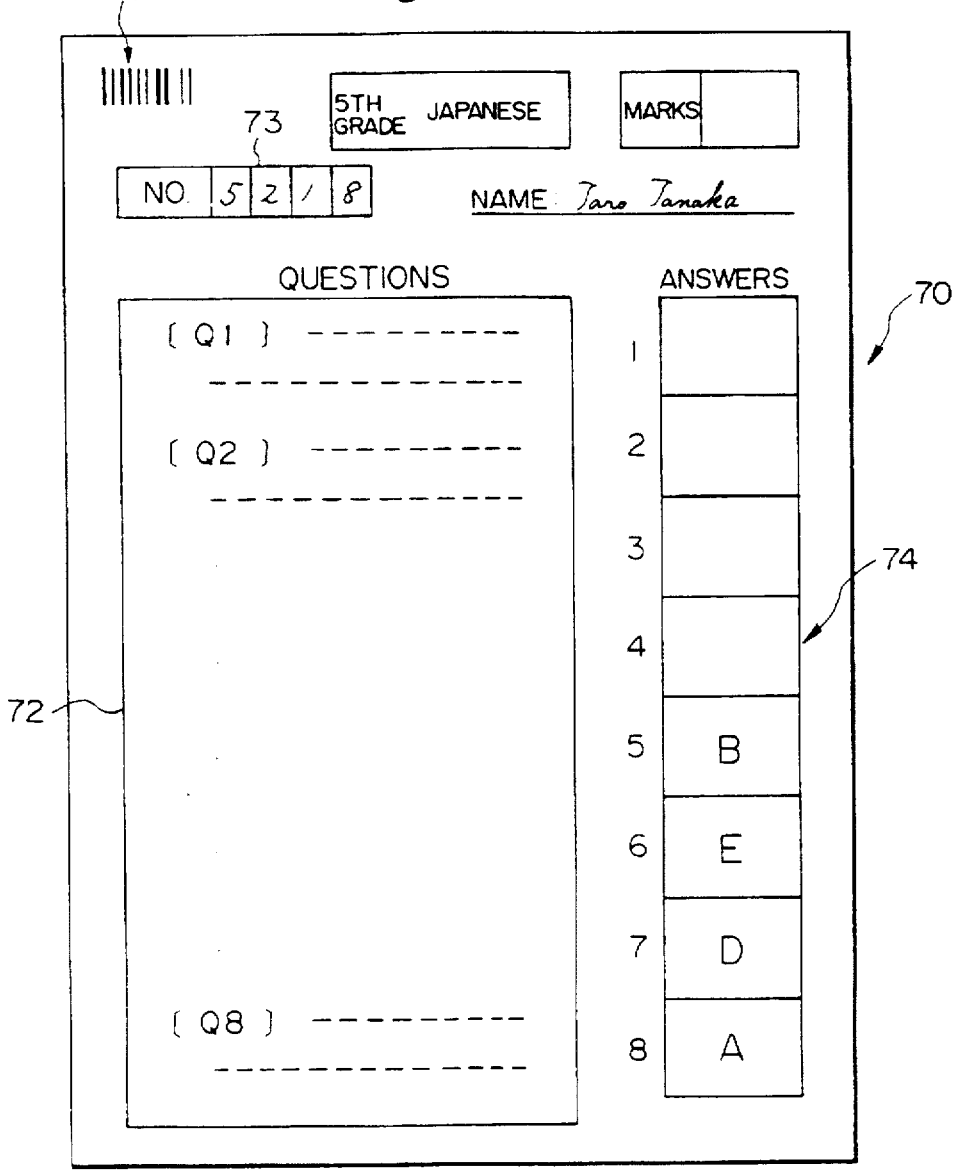
FIG. 17 shows a specific paper applicable to the present invention.
Figure 18:
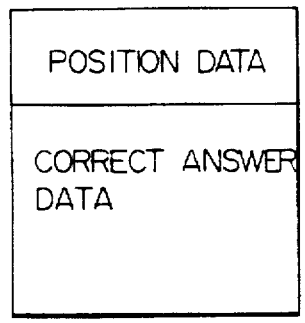
FIG. 18 shows a specific format in which correct answer data are stored.

FIG. 17 shows a specific paper 70 having an answer column filled with answers by an examinee. A bar code 71 is printed on the paper 70 and represents an ID number for identifying questions. In this case, the bar code recognition 35 recognizes the bar code 71 to determine the ID number. With the ID number, it is possible to designate, among the data stored in the data storage 42, the data associated with questions (Q1–Q8) printed on the question portion 72 of the paper 70, as stated above. As shown in FIG. 18 specifically, the correct answer data consist of codes (or patterns or font) representing the characters and symbols of correct answer data, and the positions of the answers on the paper 70. The OCR further recognizes an examinee's number entered into a number box 73 printed on the paper 70 and handwritten characters, e.g., the answers put in the answer column 74. As for the state of the art technologies for recognizing handwritten characters, the characters should preferably be limited to numerals, alphabets, katakana, signs including "+" and "−", and marks including "o" and "x" which are easy to recognize. However, a broader range of characters will be usable in the future, thanks to the advancing recognition technologies. After the above recognition, data representing the results of recognition are written to the RAM 23 in a preselected format. The marking 39 marks the recognized answers by using the correct answer data stored in the data storage 42.

Figure 16:
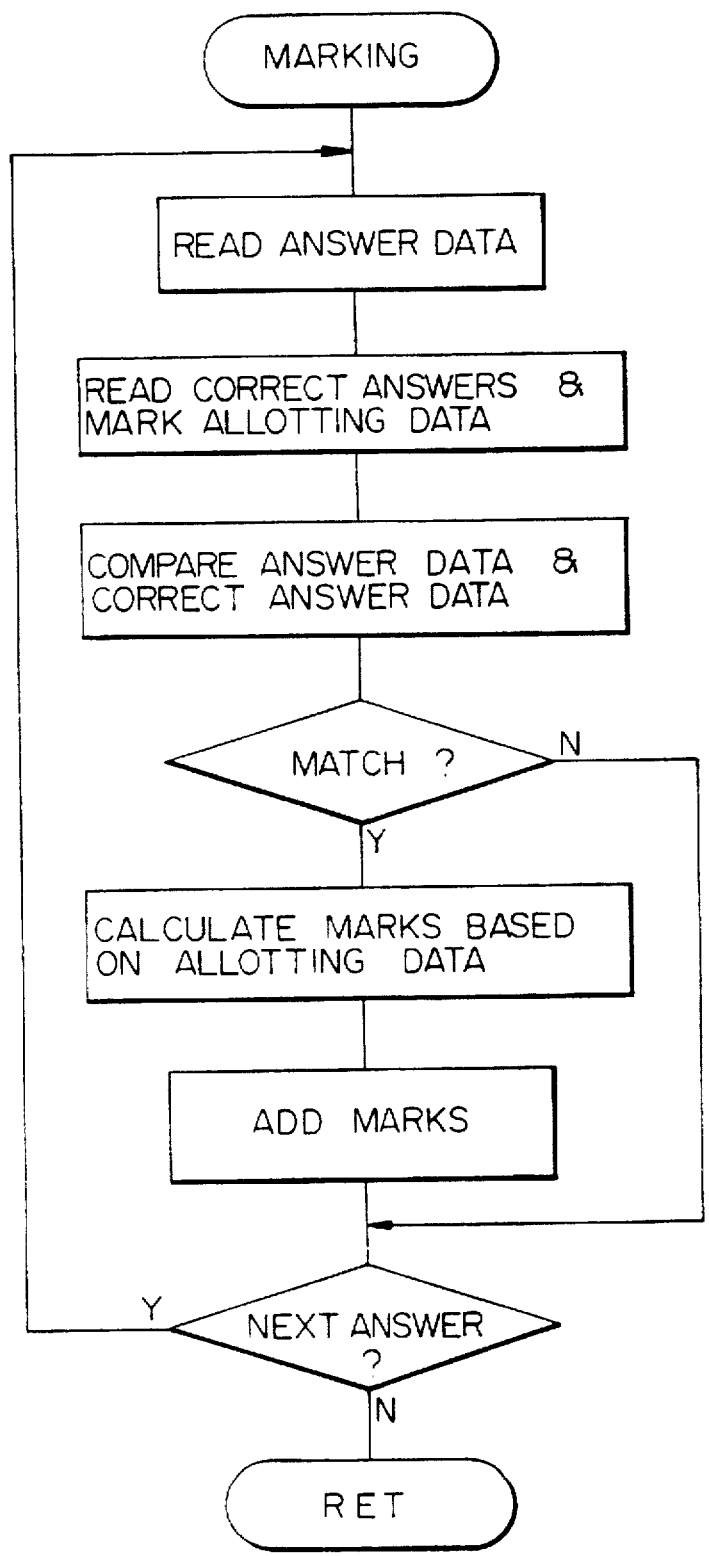
FIG. 16 is a flowchart showing a subroutine for marking included in a mark mode (I) of FIG. 15.

A marking procedure is shown in FIG. 16. As shown, the marking 39 sequentially reads the answer data out of the RAM 23 one question at a time (e.g. answer data sequentially recognized in the consecutive boxes 1–8 of the answer column 74, FIG. 17) and reads the correct answer data and mark allotting data respectively associated with the questions out of the storage 42. Then, the marking 39 determine whether or not the answer data and the correct answer data match each other and, if they match, produces a mark based on the mark allotting data. For example, assume that 10 marks is allotted, to each of [Q. 1] to [Q. 4] of the paper 70 shown in FIG. 17. Then, if the answer to [Q. 1] is correct, 10 marks is given. The marking 39 causes the RAM 23 to add up such marks. Preferably, the results of decision on the marked answers should also be written to the RAM 23. If the answer data and correct answer data do not match, the calculation and storage of marks are not effected. Further, if the same mark is allotted to all the questions, reading the mark allotting data only once will suffice.

Subsequently, whether or not the next answer data is present is determined. If the answer of this decision is positive, the program returns to the step of reading answer data. Such a procedure is repeated until all the answer data produced from a single paper have been dealt with. When the RAM 23 run out of the answer data, meaning the end of marking, the program ends this subroutine and returns to the main routine (I), FIG. 15. Whether or not the data stored in the RAM 23 should be printed out is determined. Usually, such data should be printed out, the summed mark data stored in the RAM 23 and, if the results of decision on the individual answers are also stored, such data are sent to the drawing 41. The drawing 41 draws the data from the RAM 23 over the image of the paper read by the scanner 100 and stored in the image memory 24. If the data do not have to be printed out, they are transferred to the data storage 42 as supervisory data and, at the same time, displayed on the LCD 34, FIG. 11, in a predetermined format.

The drawing 41 draws the marks or percentage in a numerical image by using the font of the ROM 22. If symbols representing "correct" and "incorrect" should be printed together with the marks, the drawing 41 also reads circle, cross and other marking patterns out of the data storage 42 and draws them in positions corresponding to the positions of the answers in the answer column. In addition, for incorrect answers, characters or symbols representing correct answers as well as comment data, if desired, may be read out of the data storage 42 and drawn over the image of the paper. For this kind of data, use may advantageously be made of a cache memory. The data drawn by the drawing 41 are sent to the selector 53, FIG. 13, while being combined with the image data of the paper read out of the image memory 24.

Figure 19:
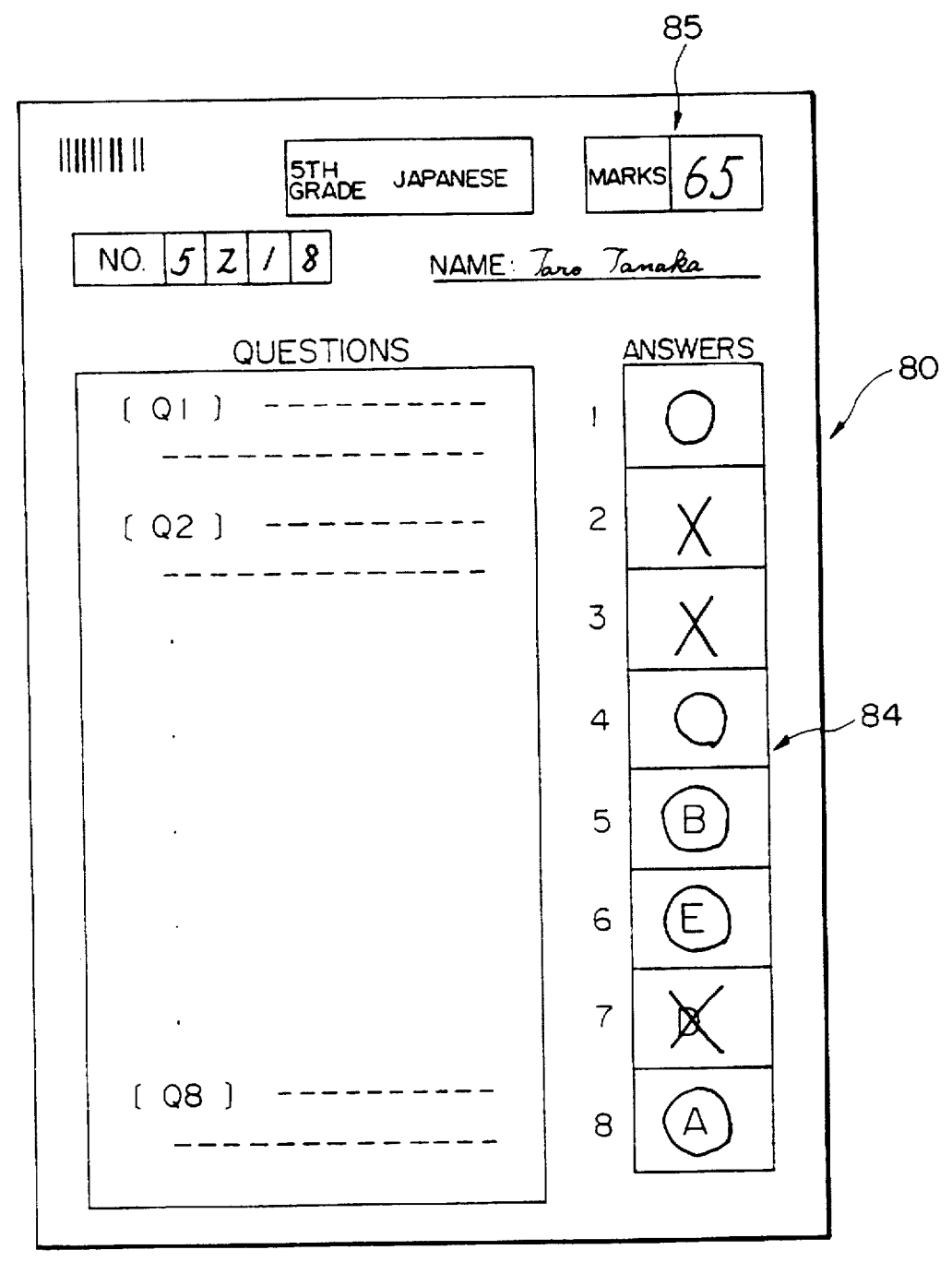

The printer 200 prints out the two kinds of image data on a single recording sheet, as shown in FIG. 19 specifically. In FIG. 19, a sheet carries an image identical with the paper 70, FIG. 17, printed thereon, marks resembling a handwriting printed in a mark box 85, and circles and crosses respectively representing correct answers and incorrect answers and also resembling a handwriting printed in an answer column 84. At this instant, the image identical with the paper 70 and the marks and circle and cross patterns may be respectively printed in black and in red. This will show the result of marking more clearly as if the answers were marked by an examiner. Of course, the developing units 204 and 207, FIG. 9, may be replaced with units storing toner other than black toner and red toner. It should be noted that while the two kinds of image data are printed out in two colors, the image representing the result of marking must be written to the area of the memory independent of the area assigned to the image of the paper 70.

Figure 20:
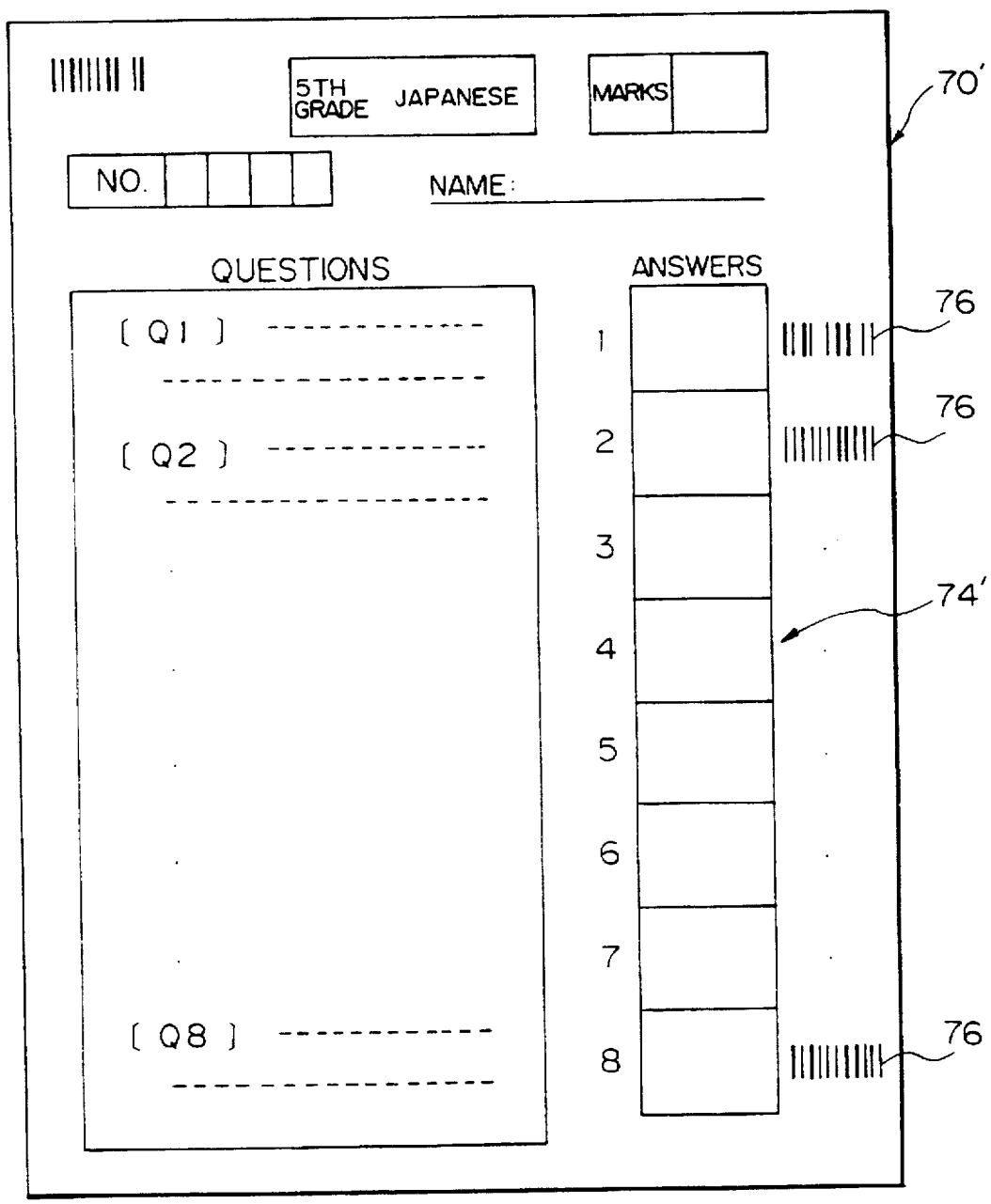
FIG. 20 shows another specific paper to be produced by the system of the present invention.

FIG. 20 shows another specific paper 70' on which bar codes 76 are respectively printed in the vicinity of the boxes 1–8 of an answer column 74'. The bar codes 76 each describes a correct answer to a question associated with one of the answer boxes 1–8. In this case, after the bar code recognition 35 has sequentially recognized the positions of the bar codes 76 and the codes represented by the bar codes 76, correct answers can be decoded from the recognized positions and codes. This makes it needless to recognize the questions, i.e., allows each answer to be marked immediately by comparing the recognized answer data and correct answer data on a question basis.

Figure 21:
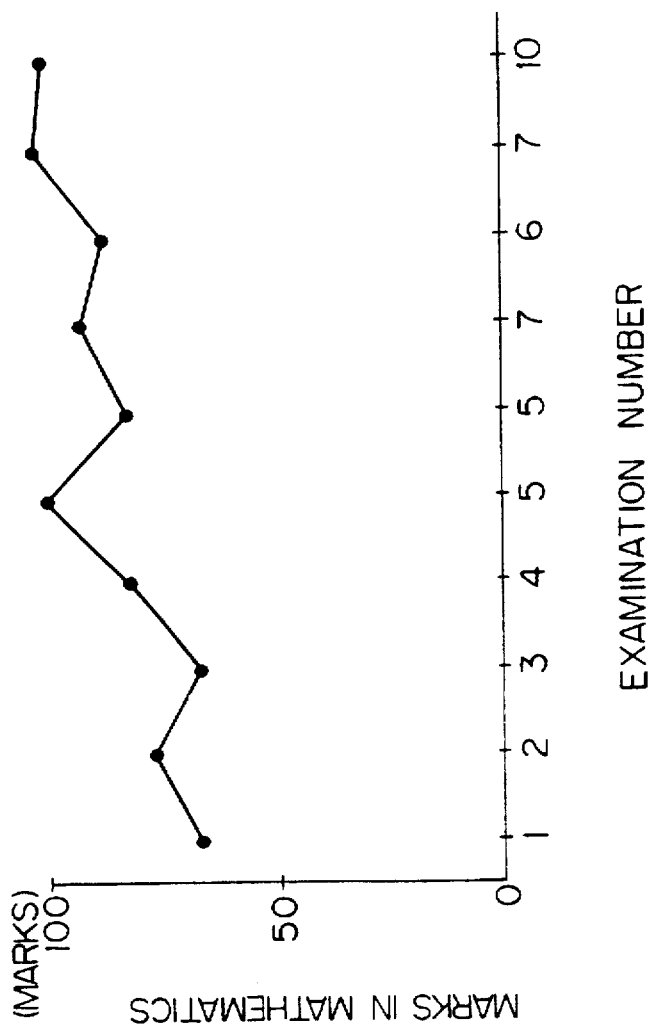
FIG. 21 shows a specific graph showing mark data.

When the graph key 12 on the operation and display panel 21 is pressed, the graph mode is set up. Then, the graph mode routine (II) shown in FIG. 15 begins. First, parameters for desired data, e.g., data for specifying data to be graphed and entered on the operation and display panel 21 are accepted. The data to be graphed include the results of a plurality of past examinations particular to an individual, and marks given to all the students in a class in; a single examination. Then, among the supervisory data stored in the data storage 42, designated data are transformed to a preselected format available with conventional graphing technologies and then written to the RAM 23. The resulting graph data are sent to the printer 200. In response, the printer 200 prints a graph on a recording sheet, as shown in FIG. 21 specifically. On the other hand, when the table key 13 on the operation and display panel 21 is selected, the table mode is set up. In this mode operation, desired data are tabulated in the same manner as the data to be graphed. FIG. 22 shows a specific table printed on a recording sheet.

When the question key 14 on the operation and display panel 21 is selected, the paper make mode is set up and causes the routine (III) of FIG. 15 to occur. First, parameters necessary for making questions, i.e., the field and level of questions to be made and the number of desired questions are entered on the operation panel 21. For example, when the field key 14b is pressed, numbers (codes) each representing a particular field appear on the display 34 and allow the operator to enter a desired field on the numeral keys 17. To enter the desired number of questions, the operator presses the number key 14c and then enters it on the numeral keys 17. Subsequently, the operator presses the receive key 14a. Then, the data base 5, FIG. 8, randomly selects, among the numerous questions registered thereat, the desired number of questions belonging to the desired field (and level) and sends them to the apparatus as question data. These question data are written to the RAM 23 or a cache memory. The drawing 41 draws the received questions in the RAM 23 in a predetermined format. Data representing the questions drawn in the RAM 23 are transferred to the printer 200 and printed out on a sheet thereby. As a result, a paper similar to, for example, the paper shown in FIG. 20 is produced. A desired number of papers, like a desired number of copies, may be entered on the operation panel 21 together with the above mentioned parameters, if desired, To enter the parameters, use may be made of a job sheet, as follows. After a job sheet has been set on the scanner 100, the scanner 100 reads it and generate corresponding image data. Characters or bar codes are recognized out of the image data, as in the mark mode, and then transformed to code data. Subsequently, a desired number of question data matching the code data are randomly read out of the data storage 42 and written to the RAM 23. At this instant, the question data, like the answer data, are stored as compressed data and are, therefore, decoded before written to the RAM 23.

The CCU 26 allows necessary question data from being transferred from the external storage 43 or an external data base and written to the data storage 42 beforehand. In such a case, if numerous questions are registered at the storage 43 or external data base while being classified by rank, they will be written to the data storage 42 in ranks. Alternatively, by supervising data representing the results of marking on an individual or group basis, it is possible to produce total data indicating, for example, the level to which an examinee belongs or the field which is low as to the percentage of correct answers, designate an individual or group so as to judge the level, and select questions belonging to a rank matching the judged level. The questions made for such an individual or group may be registered at and stored in the medium of the external storage 43 as paper data.

When the register key 15 on the operation panel 21 is pressed, the question register mode is set up. In this mode, the operator sets a new paper on the scanner 100 and then presses the start key 16. Then, the scanner 100 reads the paper in the same manner as in the mark mode. The resulting image data are once written to the image memory 24. The OCR 36 recognizes characters and rules and transforms them to a predetermined format. This format is written to the area of the RAM 23 assigned to the results of recognition and, at the same time, registered at the data storage 42. Such data in the form of a text may be written to the floppy disk, MO disk or similar medium of the external storage 43. Then, it is possible to mount the medium to, for example, a personal computer, as needed. Alternatively, the data may be directly transferred to a personal computer or the like via a network. In any case, answer data generated by the personal computer or the like can be registered at the data storage 42 as additional data.

Further, assume a paper consisting of a question portion and an answer portion in which answers were entered. Then, marker recognition available with the editing function or the cover plate 102, if it is implemented as a digitizer, may be used to recognize the answer portion and the question portion represented by image data read out such a paper while distinguishing them from each other. This kind of scheme allows a new paper and correct answer data to the questions of the paper to be registered without resorting to an editing operation on, for example, a personal computer. The printer 200 may print out the newly registered paper data (except for correct answer data) on a desired number of recording sheets so as to produce papers.

With the copier 2 shown in FIG. 9, a person, intending to mark a stack of papers, must open the cover plate 102, lay one paper on the glass platen 101, have the paper marked, open the plate 102, pick up the paper, and repeat such a procedure with the other papers since the copier 2 lacks an automatic document feeder (ADF). Assume that the copier 2 is provided with an ADF. Then, when papers are stacked on the document tray of the ADF and then the start key 16 is pressed, the papers will be automatically fed to the glass platen one by one, read by the scanner 100, and the driven out. The ADF, therefore, allows a number of papers to be marked rapidly without resorting to manual operation.

Figure 23:
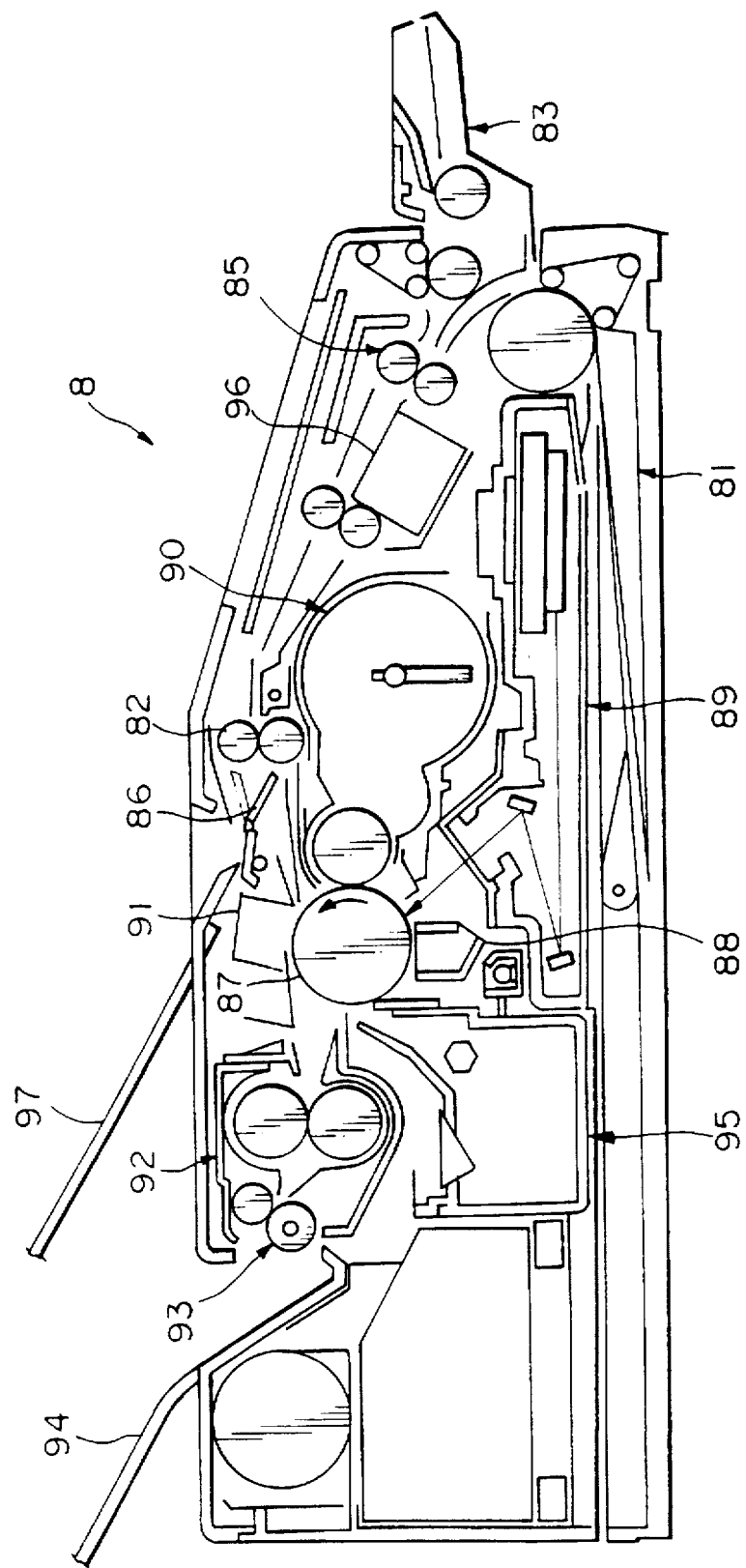
FIG. 23 is a section showing another specific mechanical arrangement of the digital copier in accordance with the present invention.

Referring to FIG. 23, another specific construction of a digital copier with which the present invention is practicable is shown. Briefly, the copier has a scanner and a printer built in a miniature housing and sharing a common sheet conveyance path. A document read by the scanner is conveyed to the printer at a predetermined timing, so that a new image may be printed on the document. Specifically, the copier, generally 8, has a cassette type sheet feed device 81 for selectively feeding recording sheets or documents, a registration roller pair 82, a manual sheet feed device 83, a timing roller pair 85, a guide or path selector 86, a photoconductive drum 87, a main charger 88, laser optics 89, a developing unit 90, and a transfer charger 91. Further, the copier 8 has a fixing unit 92, a discharge roller pair 93, a tray 94 assigned to copies, a cleaning unit 95, an image reading section 96 for reading a document image and implemented by, for example, a CCD line image sensor, and a tray 97 assigned to documents. The path extending from the timing roller pair 85 to the discharge roller pair 97 is shared by documents and recording sheets. Arranged on such a common path are an image transfer section where the drum 87 and transfer charger 91 face each other, and the image reading section 96 located upstream of the image transfer section. The application section 3 stated earlier is connected to or built in the copier 8 in order to implement the image processing device in accordance with the present invention.

An image forming procedure particular to the copier 8 is as follows. On the start of an image forming operation, a recording sheet is fed from the cassette type sheet feed device 81 toward the registration roller pair 82. On abutting against the registration roller pair 82, the sheet is stopped and corrected as to skew. After one or more pages of video data have been generated, the drum 87 is rotated in a direction indicated by an arrow in the figure. The main charger 88 uniformly charges the surface of the drum 87 to predetermined polarity. The laser optics 89 exposes the charged surface of the drum 87 by scanning it in the main scanning direction with a laser beam modulated by the video data. As a result, a latent image is electrostatically formed on the drum 87. The developing unit 90 develops the latent image by toner to produce a corresponding toner image. The transfer charger 91 transfers the toner image from the drum 87 to the sheet being driven by the registration roller pair 82. The sheet, or copy, is separated from the drum 87 and conveyed to the fixing unit 92 to have the toner image fixed thereon. The sheet coming out of the fixing unit 92 is driven out toward the tray 94 by the discharge roller pair 93. After the image transfer, the toner remaining on the drum 87 is removed by the cleaning unit 95.

The image forming procedure described above is practicable not only with a sheet fed from the sheet feed device 81, but also with a sheet or a document fed from the manual feed device 83 by hand.

How the image processing apparatus 8 reads a document image will be described hereinafter. On the start of an image reading operation, a document is fed from the manual feed device 83 to the image reading section 96 face down. The timing roller pair 85 corrects the skew of the document by stopping the movement of the document for a moment. The timing roller pair 85 drives the sheet along the reading surface of the image reading section 96. This section 96 reads an image printed on the underside of the document. When the path selector 86 is held in a position indicated by a solid line in the figure, it guides the document coming out of the image reading section 96 to the document tray 97, i.e., to the outside of the apparatus 8. When the path selector 86 i s position as indicated by a phantom line, it guides the document to the image transfer section. In this case, a new image will be formed on the underside of the document, which has been read by the image reading section 96, before the document is driven out to the tray 94

A number of documents may be stacked on the sheet feed device 81 and sequentially fed to the image reading section 96. These documents may also be conveyed to the image forming section so as to form desired images thereon.

Assume that the image processing apparatus 8 is operated in the mark mode. Papers, such as one shown in FIG. 17, collected after the examination are stacked on the sheet feed device 81 or inserted into the apparatus 8 from the manual sheet feed device 83 one by one. The timing roller pair 85 drives the paper along the reading surface of the image reading section 96 at a predetermined timing. In this case, the path selector 86 is held in the solid line position and guides the paper coming out of the image reading section 96 toward the document tray 97. At this instant, the paper is once stopped with the trailing edge thereof nipped by the registration roller pair 82. In this condition, the apparatus 8 marks the answers of the paper to the questions which have been recognized out of the image data read by the image reading section 96 and written to an image memory, as in the previous embodiment. The apparatus 8 draws a circle or a cross for each answer and marks and then forms a corresponding toner image on the drum 87. During this period of time, the registration roller pair 82 is reversed to again move the paper from the tray 97 toward the image reading section 96. Then, the path selector 86 is switched to the phantom line position. The registration roller pair 82 is again rotated forward to convey the paper to the image transfer section where the drum 87 and charger 91 face each other.

At the image transfer section, the toner image formed on the drum 87 is transferred to a predetermined position on the paper, fixed by the fixing unit 92, and then driven out to the copy tray 94. As a result, the marks and circles and crosses are directly printed on the paper. The resulting paper appears similar to the sheet 80 shown in FIG. 19. In addition, this kind of scheme does not need additional sheets which are undesirable from the resource saving standpoint, and provides the examinees with their own examination papers which appear more natural than recording sheets.

Assume that the marking step can be completed in an extremely short period of time, or that the image reading section 96 and registration roller pair 82 are spaced apart a distance greater than the length of the examination paper and, therefore, great enough for the paper read by the image reading section 96 up to the rear end to remain in a halt with the leading edge nipped by the registration roller pair 82. Then, the paper can be directly conveyed to the image transfer section without being once discharged to the tray 97. Alternatively, a circulation path may be provided in the apparatus 8 in order to return the paper from the fixing unit 92 to the registration roller pair 82. Then, after the paper read by the image reading section 96 has been simply passed through the image transfer section and fixing unit 92, it can be returned to the registration roller pair 82 and again fed to the image transfer section at a predetermined timing. This is desirable when some period of time is necessary for the marking and image drawing procedure to be completed.

The developing unit 90 may be implemented as a removable unit containing toner of desired color. Then, if a developing unit storing red toner, for example, is mounted to the apparatus 8 in the event of marking, marks can be printed in red on an examination paper which is usually printed in black and expected to be filled with answers in a color close to black by hand. The resulting paper will resemble an ordinary paper marked with a red pen. Further, when the printer has a bicolor copying function, as in the digital copier 2, or a full color copying function, a color image sensor is also located at the image reading section. Then, it is possible to recognize the color of an image printed on a paper on the basis of the image data, and mark the paper in a color different from the recognized color.

The paper making function available with the present invention will be described more specifically.

Figure 24:
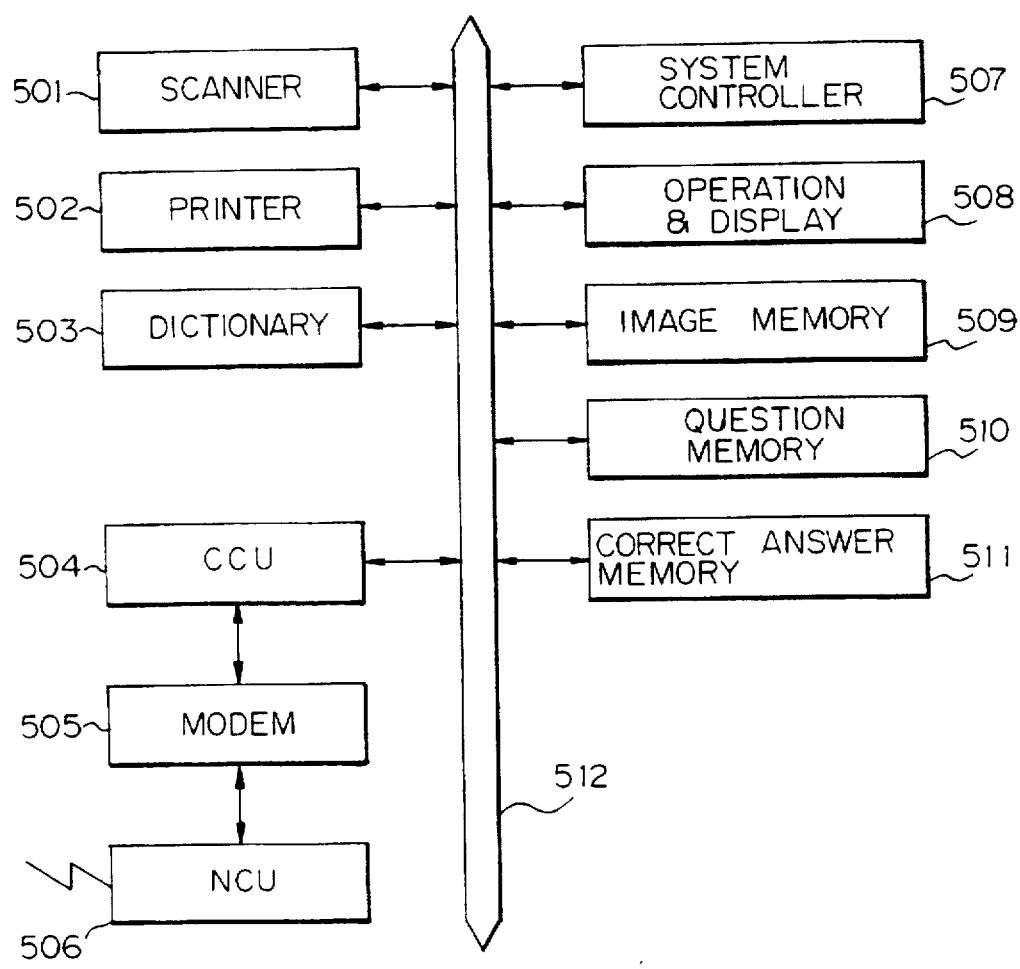
FIG. 24 is a block diagram schematically showing a system construction of the data base of FIG. 8.

FIG. 24 shows a specific system arrangement of the data base 5, FIG. 8, which is essentially similar to the system arrangement of a digital copier. As shown, the data base 5 has a scanner 501 for reading papers and sheets on which correct answers, or exemplary answers, are entered. A plotter 502 is used to print registered questions and correct answers for confirmation. A dictionary 503 is installed to recognize the contents of image data read by the scanner 501 (questions and correct answers). A CCU 504 allows questions and correct answers to be sent by facsimile. A modem 505 selectively compresses or expands such communication data. An NCU 506 is connected to a communication line in order to control originating call and terminating call. A system controller 507 executes various kinds of control particular to the present invention and predetermined data base control. An operation and display panel 508 interfaces the operator to the data base 5 when questions and correct answers are registered. An image memory 509 temporarily stores image data in the event of reading and writing images. A question memory 510 is accessible for registering a number of questions. An answer memory 511 is used to store correct answers to the questions. A bus 152 connects them to each other. The memories 509–511 may each be implemented as part of a single large capacity memory, if desired.

Figure 25:
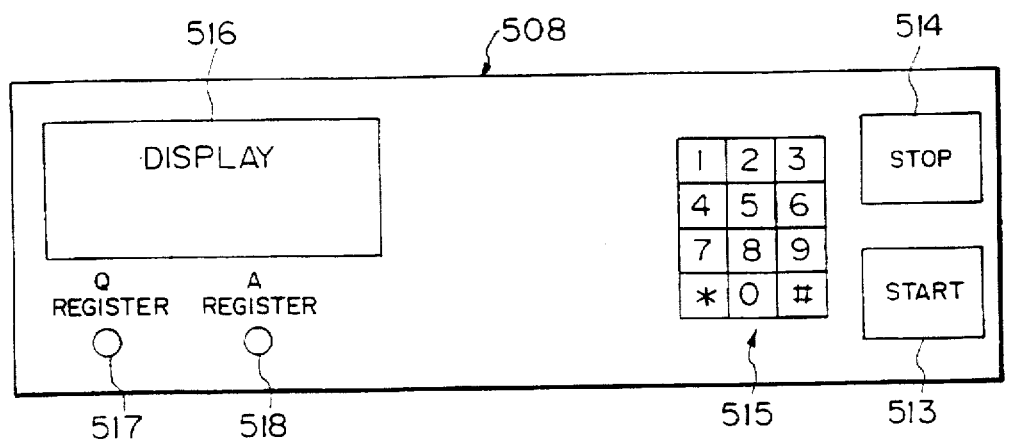
FIG. 25 is a plan view showing a specific arrangement of an operation and display panel included in the construction of FIG. 24.

FIG. 25 shows a specific arrangement of the operation and display panel 508 included in the data base 5. As shown, the panel 508, like the panel 21 of the copier shown in FIG. 11, has a start key 513, a stop key 514, numeral keys 515, and an LCD 516. In addition, a question register key 517 and an answer register key 518 are provided on the panel 508 to allow new questions and new answers thereto to be read by the scanner 501 and registered.

The operation of the data base 5 having the above construction will be described with reference to FIG. 26. First, whether or not the question register key 517 is pressed, whether or not the answer register key 518 is pressed, and whether or not a question request is received by facsimile are sequentially determined (steps S1–S3). When the answer of the step S1 is positive, Y, a question register mode is set up (step S4). When the answer of the step S2 is Y, an answer register mode is set up (step S5). When the answer of the step S3 is Y, a question send mode is set up to store data designated by the received signal (step S6). In the question register mode or the answer register mode, whether or not a document (paper or sheet with correct answers) is present on the document table of the scanner 501 is determined (step S7). If the answer of the step S7 is negative, N, the program awaits a document; if otherwise, the program waits until the start key 513 has been pressed (step S8). When the start key 513 is pressed or turned on, (Y, step S8), the document is read by the scanner 501 and then written to the image memory 509 (step S9).

Subsequently, the mode set up is determined (step S10). If the question register mode is set up, the content of the image is recognized and then registered at the question register memory 510 (step S11). At this instant, if the field and/or the rank to which the questions belong is recognized, the questions will be classified by field and/or rank. When the mode set up is the answer register mode, as determined in the step S10, the contents of the image are recognized and then written to the correct answer memory 511 (step S12). Then, whether or not the current mode is cancelled is determined (step S13). If the answer of the step S13 is N, the program returns to the step S7 and allows a plurality of documents to be sequentially read and registered. When another key is pressed as determined in the step or when a predetermined waiting time expires as determined in the step S8, the program determines that the mode has been cancelled (Y, step S13), and then cancels the mode (step S14). It is to be noted that when . a paper containing correct answer data in the form of bar codes or the like, as the paper 70' shown in FIG. 20, correct answer data do not have to be registered independently of the question data.

When the question send mode is set up in the step S6, the desired number of questions is set on a counter (step S15). Subsequently, one of the questions registered at the memory 510 and belonging to the designated field is randomly read out and sent by facsimile to the image processing apparatus sent the question request (step S16). If the question to be sent are not accompanied by correct answer data, it is preferable to read the corresponding correct answer data out of the memory 511 and send it together. After the transmission of the question, the counter is decremented by 1 (one) (step S17), and then whether or not the resulting count is zero is determined (step S18). If the answer of the step S18 is N , the program returns to the step S16 to send another question. If the answer of the step S18 is Y, meaning that all the desired questions have been sent, the set mode (question send mode) is cancelled (step S14).

Figure 27:
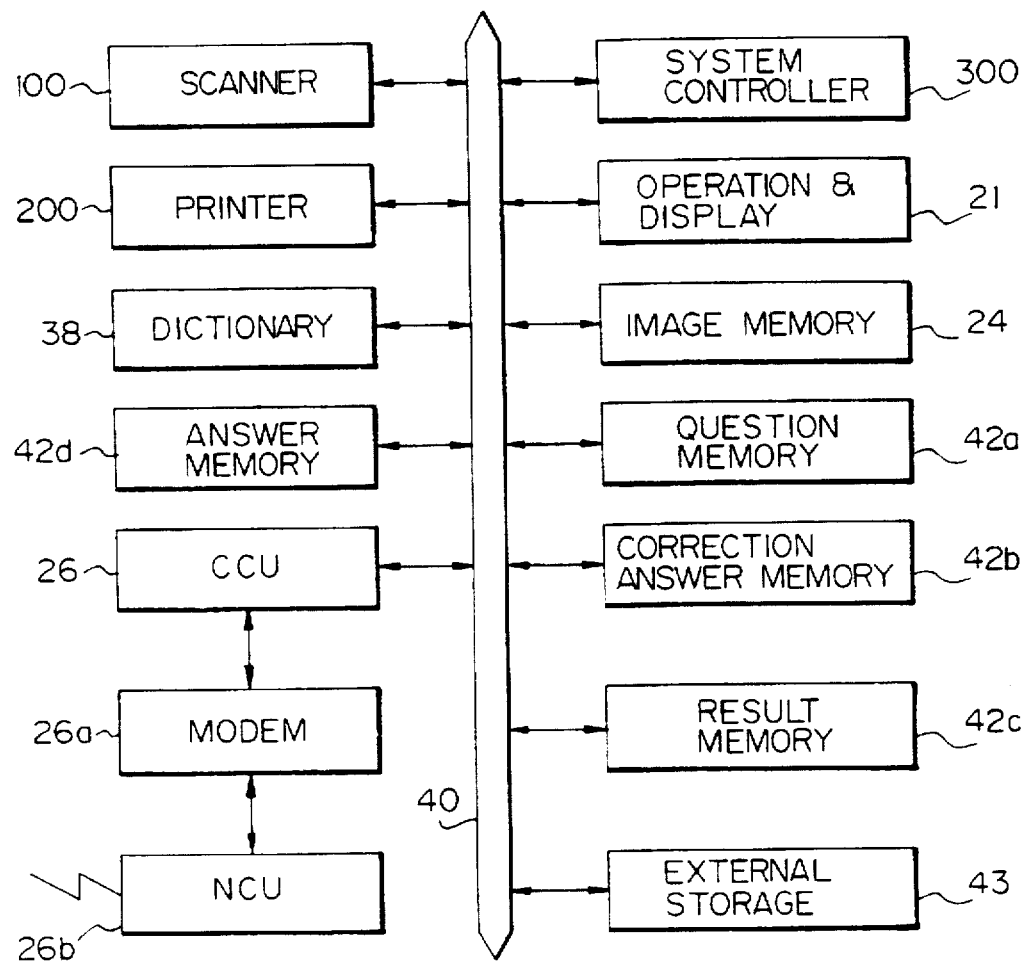
FIG. 27 is a block diagram schematically showing a specific construction of an image processing apparatus shown in FIG. 8.

FIG. 27 shows a specific construction of a digital copier which is the image processing apparatus 1 shown in FIG. 8. The figure illustrates part of the digital copier joining in the production of a paper specifically. In the figure, the same or similar constituents as or to the constituents of FIG. 12 aredesignated by the same reference numerals. As shown, the apparatus has a system controller 300, corresponding to the copy control CPU 20 and application control CPU 30, in addition to the scanner 100, printer 200, dictionary 38, CCU 26, copy control CPU 20, operation and display panel 21, image memory 24, CPU bus 40, and external storage 43. The CCU 26 sends a question request to the data base via the modem 26a and NCU 26b by a facsimile protocol and receives question data and correct answer data from the data base.

In FIG. 27, the data storage 42 is divided into a question memory 42a, a correct answer memory 42b, a result memory 42c, and an answer memory 42d. The question memory 42a is used to register questions read by the scanner 100 in the question register mode or questions received from the data base in the question receive mode. The correct answer memory 42b is used to register correct answer data read by the scanner 100 in the question register mode or correct answer data received from the data base in the question receive mode. Further, the result memory 42c plays the role of result storing means for storing, in the mark mode, the results of examination person by person or group by group. The answer memory 42d is used to store, in the mark mode, the contents of answers entered into papers and read by the scanner 100.

Figure 28:
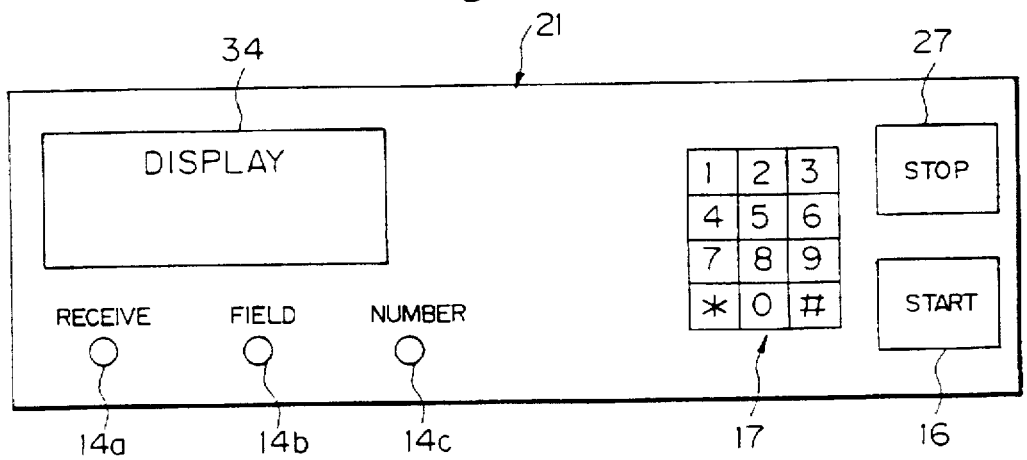
FIG. 28 is a plan view showing part of an operation and display panel of FIG. 27 which joins in the production of a paper.

FIG. 28 shows part of the operation and display panel 21 of FIG. 27 joining in the production of an paper specifically. In the figure, the same or similar constituents as or to the constituents of FIG. 11 are designated by the same reference numerals. As shown, there are arranged on the y panel 21 the start key 16, stop key 27, numeral keys 17, LCD 34, question key 14a, field key 14b, and number key 14c.

FIG. 29 demonstrates a procedure in which the apparatus produces a paper in the question receive mode. First, whether or not the question key 14a has been turned on is determined. If the answer of this step is negative, N, processing in another mode is executed; if otherwise, the question receive mode is set up. When the field key 14b is turned on, a picture showing fields of questions (subjects) appears on the LCD 34, as shown in FIG. 30 specifically. Then, the program awaits the entry of a desired field number ("10" for science, "11" for social studies or "12" for mathematics in FIG. 30). On the entry of a field number, it is stored.

When the number key 14b is turned on, a picture for urging the operator to enter a desired number of questions appears on the LCD 34, as shown in FIG. 30 specifically. Then, the operator enters a desired number of questions on the numeral keys 17. Such a number of questions is stored. Subsequently, a picture for urging the operator to enter a telephone number appears on the LCD 34, as shown in FIG. 32 specifically. A telephone number is also entered on the numeral keys 17 and stored. When the start key 16 is turned on, a call meant for the data base designated by the telephone number is originated. On the connection of the line, a question request is sent to the data base by the facsimile protocol while, at the same time, the desired field and the desired number of questions are designated. Thereafter, questions (with or without answer data) are received from the data base and written to the question memory 42a. After all the questions have been received, an image representing the desired number of questions is drawn and then printed on a sheet to produce a paper.

Figure 33:
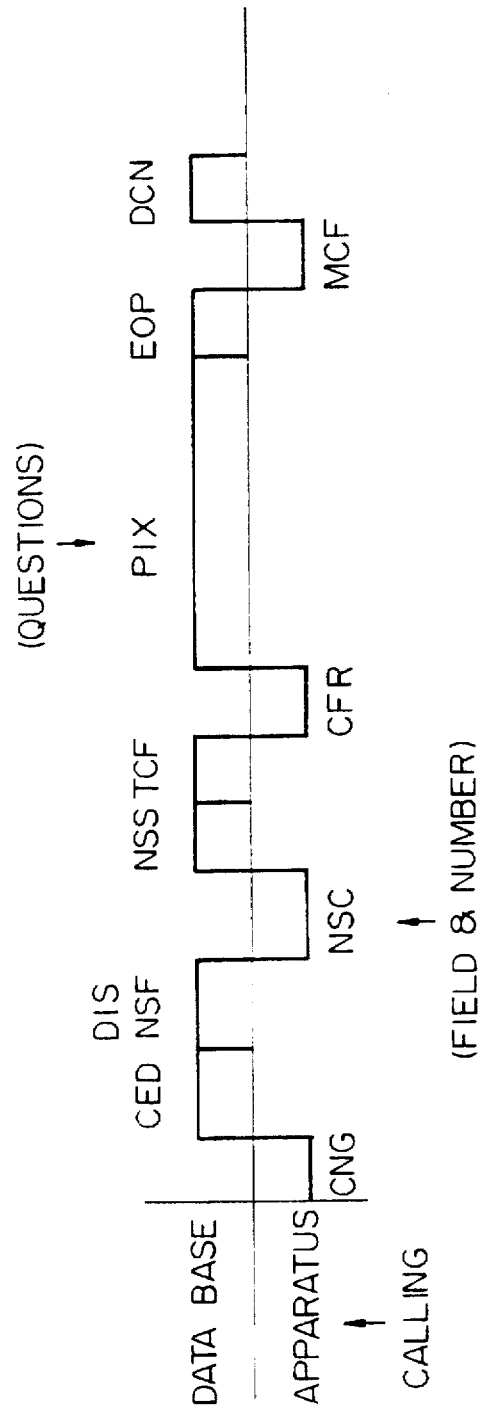
FIG. 33 is a chart demonstrating a facsimile communication protocol between the data base of FIG. 24 and the apparatus of FIG. 27.

FIG. 33 is a chart demonstrating the facsimile protocol between the data base and the image processing apparatus (digital copier). As shown, on the origination of a call on the apparatus, a polling receive mode is set up. In this condition, a desired field and a desired number of questions are designated by a signal NSC. Question data sent from the data base in the form of image data are received as a signal PIX. While signals to be interchanged between the calling station and the called station by the facsimile protocol are well known in the art, they will be outlined hereinafter. A signal CNG is a 1100 Hz signal to be sent from the calling station first a signal CED is a 2100 Hz signal which the called station sends first in response to the signal CNG. Signals DIS and NSF are identification signals sent from the calledstation after the signal CED and having a frame format. The signal DIS indicates that the called station has a receiving function prescribed by the CCITT standards. The signal NSF is a non standard function identifying signal having at least two octets of FIF and for identifying a particular user's request which does not belong to the range of Recommendations T. A signal NSC is a digital non standard function command signal returned from the calling station in response to the information contained in the NSF signal. A signal NSS is a non standard function setting signal indicative of a function to be selected from the non standard functions indicated by the signal NSC or NSF. A signal TCF is a training check signal for confirming the training of a modem, which will receive a facsimile message, to thereby determine whether or not a channel is usable at the current transmission rate. A signal CRF is an acknowledge signal showing that the preliminary procedure has ended and a message can be sent. A signal PIX represents facsimile image data (message). A signal EOP is an end of procedure signal shows that no documents to be sent are present after the end of a page of facsimile image data. A signal MFC is a positive response to EOP and indicates that a message has been fully received. A signal DCN indicates the start of a phase E and is a disconnection command which does not need a response.

Figure 34:
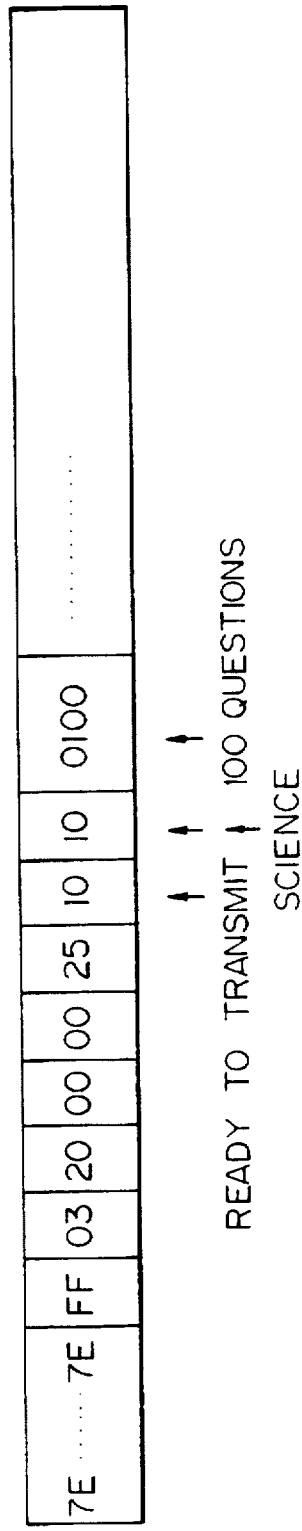
FIG. 34 shows a specific format of a signal NSF to be sent from the data base.

FIG. 34 shows a specific signal NSF to be sent from the data base. As shown, the signal NSF includes "10" showing that questions can be transmitted, "10" showing that the field of questions is science, and "0100" showing that 100 questions are to be sent.

Figure 35:
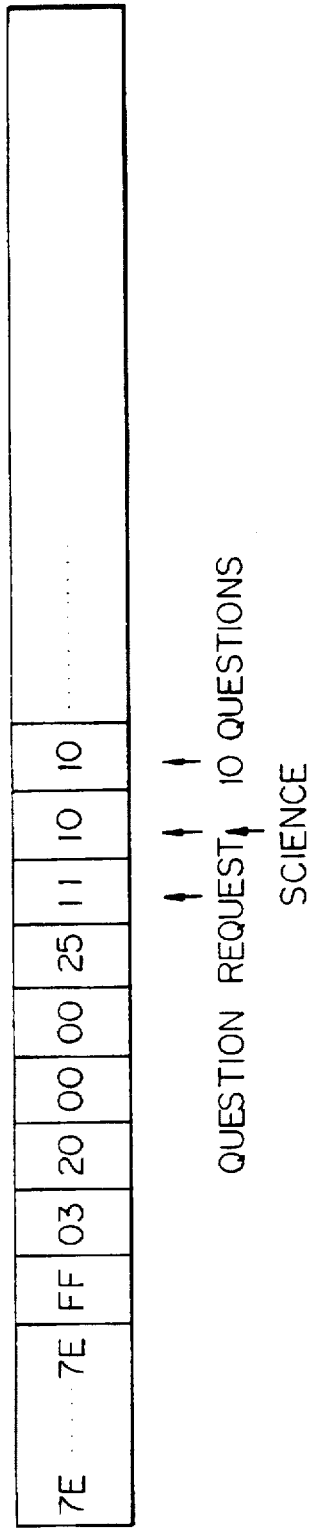
FIG. 35 shows a specific format of a signal NSC to be sent from the apparatus.

FIG. 35 shows a specific signal NSC to be sent from the image processing apparatus and includes "11" representing a question request, "10" designating science, and "10" showing the desired number of questions.

Figure 36:
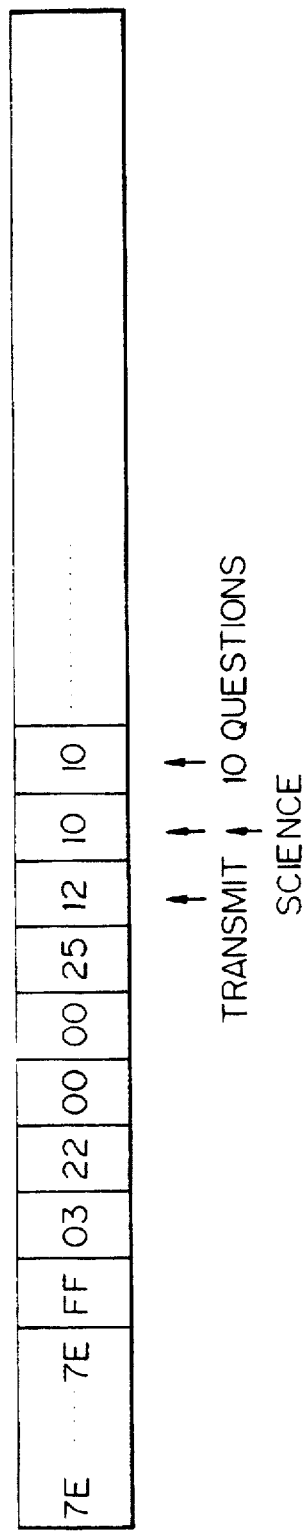
FIG. 36 shows a specific format of a signal NSS to be sent from the data base in response to the signal NSC.

FIG. 36 shows a specific signal NSS to be sent from the data base in response to the signal NSC. As shown, the signal NSS includes "12" indicting the transmission of questions, "10" indicating science, and "10" indicating ten questions.

In this manner, the image processing apparatus can inform the base station of the desired field (subject) and the desired number of questions by use of the signal NSC, while the data base can send the designated number of questions by analyzing the signal NSC.

FIG. 37 shows how a number of questions are registered at the data base and classified by field (subject) and rank (degree of difficulty). In this case, questions can be selectively sent to the image processing apparatus on the basis of a rank (easy or difficult). The procedure to be executed by the image processing apparatus is essentially similar to the procedure of FIG. 29. However, since a desired rank can be designated, steps enclosed by a phantom line in FIG. 38 are executed between the storage of the number of questions and the display of the picture assigned to the entry of a telephone number. Specifically, a picture for urging the operator to enter a desired rank (degree of difficulty) appears on the LCD 34, as shown in FIG. 39 specifically. On the entry of the rank, it is stored. Subsequently, the picture assigned to a telephone number appears on the LDC 34. In addition, when a question request is to be sent, as shown in FIG. 29, the rank is designated together with the field and number of questions.

Figure 40:
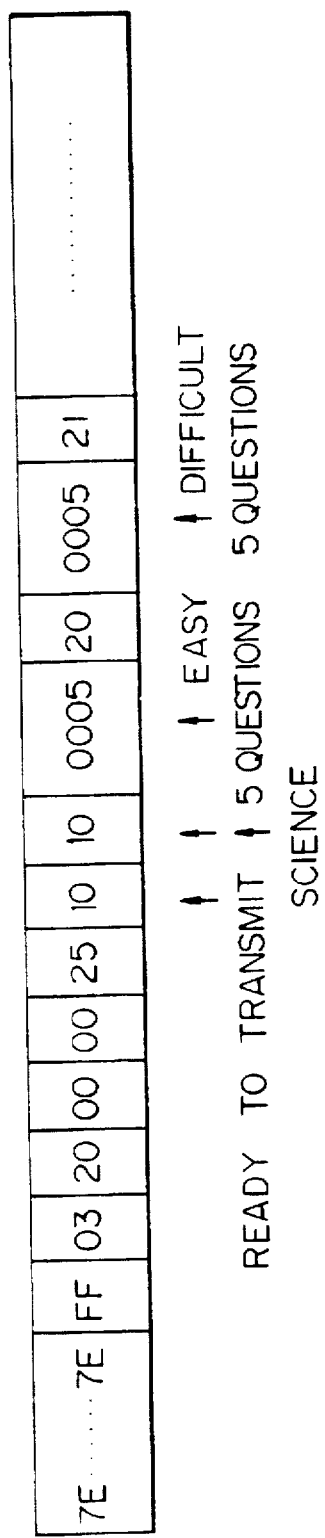
FIG. 40 shows a specific format of the signal NSF to be sent from the data base in the procedure of FIG. 38.
Figure 41:
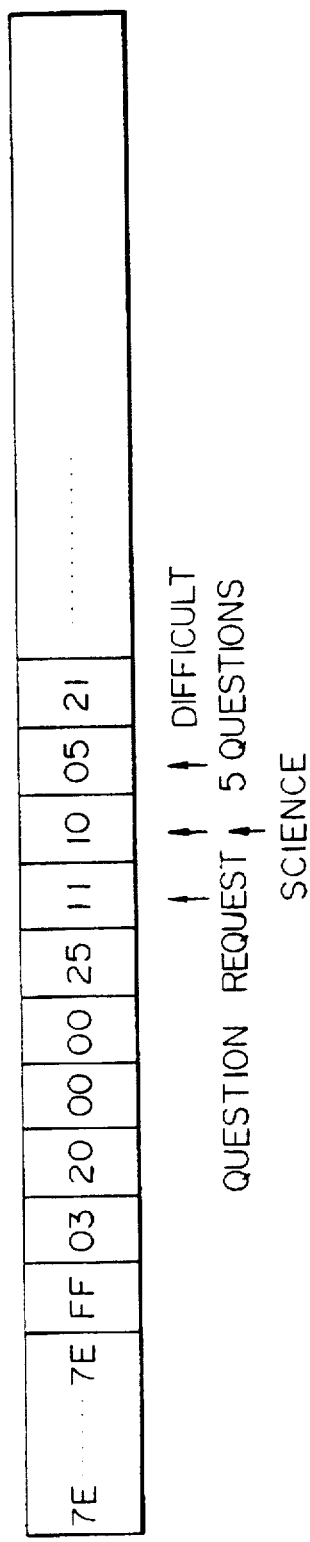
FIG. 41 shows a specific format of the signal NSC to be sent from the apparatus in the procedure of FIG. 38.
Figure 42:
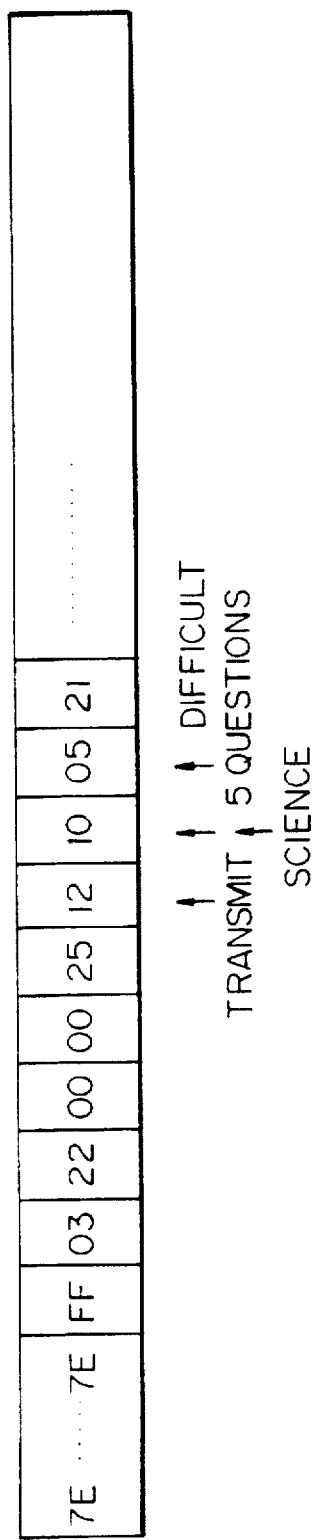
FIG. 42 shows a specific format of the signal NSS to be sent from the data base in response to the signal NSC in the procedure of FIG. 38.

FIG. 40 shows a specific signal NSF to be sent from the data base to the image processing apparatus when a rank is designated. As shown, the signal NSF includes "10" indicating that questions can be sent, "01" indicating that the field is science, "0005" indicating that the number of questions is five, "02" indicating that the questions are easy, "0005" indicating that the number of questions is five, and "21" indicating that the questions are difficult. FIG. 41 shows a specific signal NSC which the image processing apparatus returns to the data base in response to the signal NSF. As shown, the signal NSC includes "11" representing a question request, "10" designating science, "05" indicating that five questions are requested, and "21" indicating that those questions should be difficult. FIG. 43 shows a specific signal SCC which the data base sends in response to the signal NSC and including "12" indicating the transmission of questions, "10" designating science, "10" representing five questions, and "21" showing that the questions are difficult.

FIG. 43 shows a specific result supervising table stored in the result memory 42c and listing marks produced by the procedure of FIG. 27. The results of consecutive examinations are sequentially stored and accumulated on an individual or group (grade) basis. As shown, a particular name code is assigned to each examinee and entered into a paper together with a name. Then, it is possible to read the name codes (101, 102, 201 and 202 in FIG. 43) together with the marks. The marks are averaged person by person or group by group and classified by rating (A–C).

Figure 45:
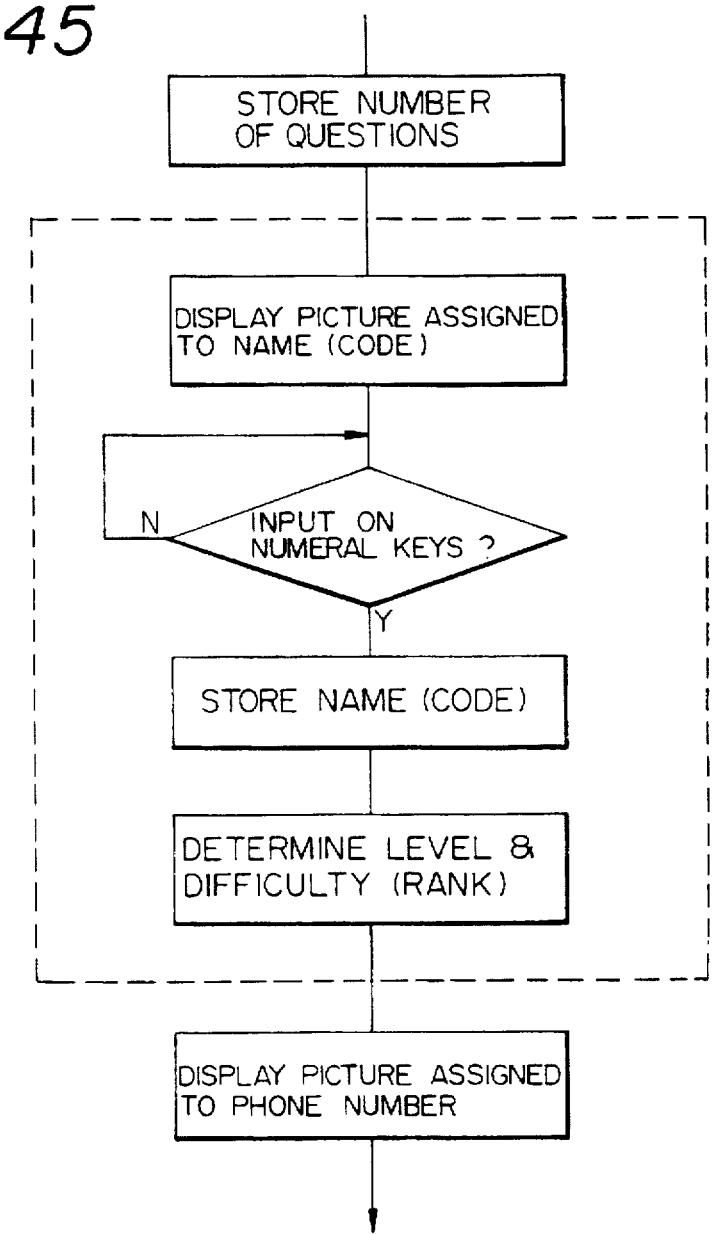
FIG. 45 is a flowchart demonstrating processing to be added to FIG. 29 when the apparatus is capable of automatically selecting a rank of questions.
Figure 46:
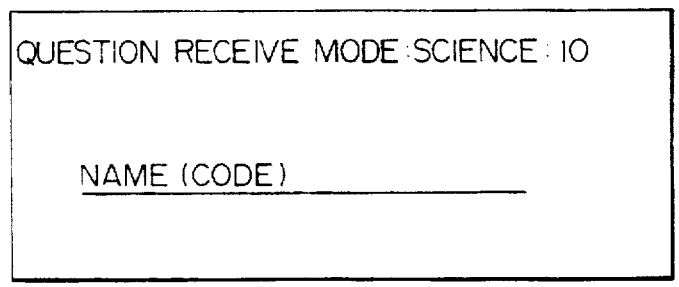
FIG. 46 shows a specific picture to appear in the procedure of FIG. 45 for urging the operator to enter a name (code).

FIG. 44 shows criteria which the image processing apparatus uses to check the result supervisory table and determine the level of questions. As shown, the apparatus determines that the questions made for the individuals or groups rated A or B are "difficult" and the questions made for the individuals or groups rated C are "easy". Hence when a person rated B requests the data base to send questions, the data base automatically selects "difficult" question; when a person rated C will be automatically provided with "easy" questions. This can be implemented by a procedure essentially similar to the procedure of FIG. 29, except that steps enclosed by a phantom line in FIG. 45 occur between the storage of the number of questions and the display of the picture assigned to a telephone number. Specifically, a picture shown in FIG. 46 appears on the LCD 34 to urge the operator to enter a name (code). When the operator enters a name (101, 102 or the like), the apparatus stores it and then references the table of FIG. 43 to see a level matching the name. Subsequently, the apparatus automatically determines the degree of difficulty of questions to make by referencing the relation shown in FIG. 44. Thereafter, the picture assigned to a telephone number, FIG. 32, appears on the LCD 34. When individuals are replaced with groups (e.g. grades), a particular code number will be assigned to each group. Further, when a question request is sent to the base station by the procedure of FIG. 29, the degree of difficulty (rank) automatically determined on the basis of the name of a person or that of a group is designated together with the field and number of questions.

The apparatus shown in FIG. 27 has the external storage 43 and can, therefore, store questions received from the data base and paper data drawn on the basis of the questions.

The embodiments have been shown and described in relation to an image processing apparatus implemented as a digital copier and having a paper making function and an automatic marking function. However, they are practicable even with equipment other than a digital copier and having one or both of the two functions.

In summary, it will be seen that the present invention provides an examination paper making system having various unprecedented advantages, as enumerated below.

(1) Any person can produce various kinds of papers rapidly and easily by designating only a desired number of questions and, if necessary, a field (subject) and other factors. Even a learner can produce a paper and test himself. Further, when an individual or a group is designated, questions belonging to a rank (degree of difficulty) which matches the past results of the individual or group can be prepared.

(2) When the system is provided with an automatic marking function, it automatically marks a paper with answers only if the paper is set on a scanner. Assume that a digital copier, or image forming apparatus, is provided with the paper making function and automatic marking function to construct the paper making system. Then, while the system usually operates as a copier, it can produce a paper and automatically mark it, as desired. Hence, such functions are achievable without resorting an exclusive apparatus and reduces equipment cost while promoting the efficient operation of the copier.

(3) When the image processing apparatus itself has a scanner, the scanner may be used to read and register questions other than questions available, from a data base. In this case, the apparatus can register numerous new questions thereat without receiving questions from the data base. If desired, both the questions registered at the data base and the questions registered at the apparatus may be used to produce a new paper. If such questions and data associated with a paper drawn are written to an external storage, a paper identical with the paper made in the past can be easily produced at any desired time.

(4) When the image processing apparatus has the automatic marking function, marks and circles, crosses, triangles and other patterns representing the evaluation of the individual answers may be formed and output on a paper in a color different from the color of the questions and answers. The resulting marked paper will appear as if the actual paper were marked, facilitating the examiner's recognition.

Various modifications will become possible for those skilled in the art after receiving the teachings of the present disclosure without departing from the scope thereof.

What is claimed is:

1. A system for making an examination paper, comprising:
   a data base storing a number of questions registered thereat; and
   an apparatus for making an examination paper by using the questions registered at said data base;
   said apparatus comprising:
      question storing means for storing data representing the questions received from said data base either directly or via a network;
      number designating means for designating a desired number of questions;
      question making means for randomly selecting, among the number of questions registered at said data base, the desired number of questions and writing said desired number of questions in said question storing means to thereby make questions; and
      outputting means for forming an image representing the questions made by said question making means on a recording sheet and outputting said recording sheet as an examination paper.

2. A system as claimed in claim 1, wherein said apparatus further comprises an external storage for storing the questions made by said question making means in a form of data representing the examination paper.

3. A system for making an examination paper, comprising:
   a data base storing a number of questions registered thereat; and
   an apparatus for making an examination paper by using the questions registered at said data base;
   said data base comprising question registering means for registering the number of questions while classifying said questions by rank;
   said apparatus comprising:
      question storing means for storing data of the questions received from said data base either directly or via a network;
      result storing means for storing results of past markings on an individual basis or a group basis;
      number designating means for designating a desired number of questions;
      designating means for designating an individual or a group;
      level determining means for determining, based on data stored in said result storing means and representing the results of past markings, a level of the individual or the group designated by said designating means;
      question making means for selecting, among the number of questions registered at said data base and classified by rank, the desired number of questions designated by said number designating means and belonging to the rank matching the level determined by said level determining means, and for storing said desired number of questions in said question storing means to thereby make questions; and
      outputting means for forming an image representing the questions made by said question making means on a sheet and outputting said sheet as an examination paper.

4. A system as claimed in claim 3, wherein said apparatus further comprises an external storage for storing the questions made by said question making means in a form of data representing the examination paper.

* * * * *